(12) United States Patent
Auerbach

(10) Patent No.: US 7,216,127 B2
(45) Date of Patent: May 8, 2007

(54) BYTE STREAM ORGANIZATION WITH IMPROVED RANDOM AND KEYED ACCESS TO INFORMATION STRUCTURES

(75) Inventor: Joshua S. Auerbach, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 10/738,377

(22) Filed: Dec. 13, 2003

(65) Prior Publication Data

US 2005/0131917 A1    Jun. 16, 2005

(51) Int. Cl.
*G06F 7/00* (2006.01)
(52) U.S. Cl. .......................... 707/100; 707/102; 707/2; 707/3; 707/206
(58) Field of Classification Search ................ 707/100, 707/2, 3, 102, 206; 341/100; 715/502; 711/154, 711/170
See application file for complete search history.

(56) References Cited

U.S. PATENT DOCUMENTS 6,199,082 B1 * 3/2001 Ferrel et al. ................ 715/522
6,459,393 B1 * 10/2002 Nordman ..................... 341/100
2003/0177341 A1 * 9/2003 Devillers .................... 712/227
2004/0028049 A1 * 2/2004 Wan ........................... 370/394
2005/0091576 A1 * 4/2005 Relyea et al. ............... 715/502
2006/0064424 A1 * 3/2006 Heuer et al. ................ 707/100

* cited by examiner

*Primary Examiner*—John Cottingham
*Assistant Examiner*—Michael D. Pham
(74) *Attorney, Agent, or Firm*—Cantor Colburn LLO

(57) ABSTRACT

The invention improves processing time when accessing information in a byte stream and avoids the step of deserializing unneeded portions of the byte stream when the byte stream encodes an information structure corresponding to a schema with arbitrarily nested lists and tuples. It facilitates efficient keyed access when lists of tuples represent tables with key columns by storing tables in nested column order, which extends the well-known concept of column-order so as to apply to arbitrarily nested tables. Using well-known offset calculation techniques within the nested lists that result from nested column order, the invention achieves greater efficiency by grouping together all scalar information items that correspond to the same node in a tree representation of the schema.

20 Claims, 9 Drawing Sheets

Fig. 7

| O | O | O | O | D 8 | D 4 | L | S | O | O |
|---|---|---|---|---|---|---|---|---|---|
| 8 | 46 | 124 | 172 | 208 | "mary" | 63 | 30 | 2 | 8 | 19 |
| 200 | 201 | 202 | 203 | 204 | 205 | 206 | 207 | 208 | 209 | 210 |

| D 11 | D 7 | O | O | L | S | O | L | S | D 7 |
|---|---|---|---|---|---|---|---|---|---|
| "charles" | "dog" | 12 | 20 | 74 | 2 | 27 | 15 | 1 | 4 | "cow" |
| 211 | 212 | 213 | 214 | 215 | 216 | 217 | 218 | 219 | 220 |

| L | S | O | O | O | D 8 | D 7 | D 8 | L | S |
|---|---|---|---|---|---|---|---|---|---|
| 39 | 3 | 12 | 20 | 27 | "bird" | "joe" | "lime" | 44 | 2 |
| 221 | 222 | 223 | 224 | 225 | 226 | 227 | 228 | 229 | 230 |

| O | L | S | O | L | D 4 | D 4 | D 4 | D 4 | L | S | O | O |
|---|---|---|---|---|---|---|---|---|---|---|---|---|
| 8 | 20 | 8 | 1 | 16 | 4 | -1 | 5 | 613 | 32 | 2 | 8 | 17 |
| 231 | 232 | 233 | 234 | 235 | 236 | 237 | 238 | 239 | 240 | 241 | 242 | 243 | 244 |

| L | S | D 1 | L | S | D 1 | D 1 | D 1 | D 4 | D 8 |
|---|---|---|---|---|---|---|---|---|---|
| 5 | 1 | true | 7 | 3 | false | false | true | -12 | "pear" |
| 245 | 246 | 247 | 248 | 249 | 250 | 251 | 252 | 253 | 254 |

BYTE STREAM ORGANIZATION WITH IMPROVED RANDOM AND KEYED ACCESS TO INFORMATION STRUCTURES

FIELD OF THE INVENTION

The invention is directed to improving the performance of systems that access information selectively from information structures organized as byte streams. These include content-based publish/subscribe messaging and database systems.

BACKGROUND OF THE INVENTION

Content-based publish/subscribe messaging requires access to arbitrary message fields in each network node in order to route messages. Messages arrive as byte streams and only a few of the message's fields need to be accessed. However, the fields used to make routing decisions may be anywhere in a complex structured message. The property of random access to fields in a byte stream enables routing decisions to be organized optimally without regard to the order in which information is extracted from the byte stream, and it completely avoids any overhead associated with parsing information that isn't needed. The same property of random access to information structures stored in a byte stream form is useful in other systems as well, for example, database systems.

It is well known that untagged binary formats can provide constant time random access to fields in a byte stream by using offset calculations (perhaps indirected through offsets stored in the byte stream). However, this only works when the information structure is "flat" (does not involve any nesting of information). In practice, most information structures are not flat.

An information structure with a flat structure may be characterized as a tuple (or "structure" or "record"). The schema for such an information structure calls for a fixed sequence of fields. In this description, we use the notation [ ..., ..., ... ] for tuple schemas. So, [int, string, boolean] might be the schema for an information structure containing an integer followed by a string followed by a boolean.

Ways in which information structures such as messages nest information and therefore deviate from flatness include at least the following.

Tuples may be nested. That is, the schema for an information structure might be [int, [int, string, [string, boolean]]].

Any schema element may be repeated zero or more times, forming a list. In this description, we use the notation *( ... )* for a list in a schema. So, *(int)* means a list of zero or more integers. A list of tuples (often called a "table" or "relation") is also possible. So, *([int, string, boolean])* is the schema for a table with three columns (an integer column, a string column and a boolean column) and zero or more rows. In most relational databases, each row is a flat structure. But, in messages and advanced databases, each row may have nested tuples and embedded tables, with no intrinsic limit to how deep such nesting can go. Tuples and lists must be allowed to nest in arbitrary ways to accurately describe information structures in general.

Information structures may be recursive. For example, a field of a tuple may be defined as another instance of the tuple itself or of an encompassing tuple or list (this cannot be illustrated readily with the present notation).

Information structures may include variants in additions to tuples and lists. A variant indicates that either one type of information or another (not both) may appear. Information structures may also include dynamically typed areas in which any kind of information may appear.

It is common to define certain columns of a table as key colums. A lookup in the information structure requires finding a particular value in a particular column of the table, after which only that row (or only a specific field from the row) is accessed. In a database, an index might be built in order to do this efficiently. In messages, the tables are rarely large enough to benefit from a precomputed index, and transmitting such an index in the message adds unacceptable overhead. So, for utility in the messaging domain a processor should be able to scan just the key column (sequentially) and then randomly access just the information in its row.

In addition to what is known about using offset calculations to provide constant time access to completely flat information structures like [int, string, boolean] said techniques are readily extended to encompass just nested tuples (with no lists) such as [int, [int, string, [string, boolean]]] (by treating it as if it were [int, int, string, string, boolean]. This is what is done, for example, in an optimizing compiler when compiling code for nested struct declarations in (for example) the C language.

A tuple containing fields of varying length requires some pointer indirection in order that all the offsets are still known. For example, if int and boolean have a fixed-length representation but string does not, then we might represent the two string values in [int, int, string, string, boolean] as fixed-length pointers to strings stored elsewhere in memory. That way, the last two fields of the tuple are still at a fixed distance from its start (which is how programming languages solve the problem). It is well-known that a pointer to elsewhere in memory can be represented as a stored offset to elsewhere in a byte stream. So, this issue is solvable for byte streams as well as computer memories. Solutions like this are embodied in many Internet protocols to speed up access to information following a varying length field.

A simple table (where each row is flat because there are no nested tuples or lists) can be stored in either row order or column order. Varying the storage order for simple multi-dimensional arrays is a well-known technique for optimizing compilers. Relational databases often store tables in column order, since this can improve scan time for key columns that lack indices. However, in messaging, the representation is usually a tree structure and serialization of messages is done by recursive descent, which results in storing all tables in row order. In any case, the well-known technique of storing tables in column order must be extended in non-obvious ways to be useful when schemas use arbitrary nesting of lists within tuples within lists.

Schemas whose structure is inconvenient can sometimes be transformed into isomorphic schemas that are more convenient. The flattening of [int, [int, string, [string, boolean]]] to [lint, int, string, string, boolean] is an example of one such isomorphism. The same kind of flattening can be applied to variants. It is also known to those skilled in the field of type theory that tuples can be distributed over variants to yield an isomorphic schema. If we use the notation {int|boolean } to mean the variant whose cases are int or boolean, then [string, {int|boolean }] is isomorphic to {[string, int]|[string, boolean]}. This observation has been used to improve message processing time in IBM web sites employing the Gryphon system since 2001, and also in the IBM Event Broker product.

SUMMARY OF THE INVENTION

The invention improves access time for elements of lists in randomly accessing a byte stream, particularly when lists represent tables with key columns. It works with information structures whose schemas contain arbitrarily nested tuples and lists. It works in the presence of other information structure elements such as variants, recursion, and dynamic typing, although its improvements are focused on lists.

The invention stores tables in nested column order, extending the concept of column order so as to apply to arbitrarily nested tables. By using standard offset calculation techniques within the nested lists that result from nested column order, the invention makes both sequential scanning and random access (by row position) efficient. Thus, the problem of finding row contents corresponding to a specific value of a key column is rendered efficient and this extends to nested cases.

We first describe the invention with reference to the following example schema, using the notation introduced earlier.

*([string , *([string, int])* ])*

This schema describes information structures each is comprised of a table with two columns. The first column contains string values, but the second column contains "table" values. Each table appearing as a value in the second column is itself a table of two columns, a string column and an int column. For example, one might have an information structure conforming to this schema whose logical structure is as follows.

| "ages" | "john" | 22 |
|---|---|---|
|  | "mary" | 14 |
|  | "bill" | 32 |
| ""temperatures" | "arizona" | 89 |
|  | "alaska" | 27 |

Looking only at the schema, we see that it contains three entries of scalar type, which could be labeled as follows:

| *( [ string , *( [ string, int ] )* ] )* |
|---|
| 1              2           3 |

Each of these entries will give rise to exactly one encoding area in the byte stream. The start of each encoding area will be known by storing its offset in the byte stream at a known offset from the beginning. Area 1 is a list of strings. In the serialization of the example table it would contain "ages" "temperatures"

(an example of column order as usually understood).

Area 2 is a list of lists of strings. In the serialization of the example table it would contain ("john" "mary" "bill")("arizona" "alaska")

This is an example of nested column order.

Area 3 is a list of lists of int. In the serialization of the example table it would contain (22 14 32)(89 27)

(another example of nested column order).

The byte encoding for a list comprises the number of elements in the list followed by an encoding that depends on whether the fields have fixed or varying length. Fixed length fields are just stacked immediately after each other, since the offset to any one of them can be computed by multiplying the index position by the length of each field. For example, if an int requires four bytes to encode, then the list (22 14 32) can be efficiently encoded in 12 bytes. The first element is at offset 0, the second at offset 4, the third at offset 8 and there is no need to record any offsets in the byte stream.

However, varying length fields require offsets to be recorded. Thus, the list ("john" "mary" "bill") would be recorded as a table of offsets to the actual elements. Since the offset entries have fixed length, these can be randomly accessed. The offset table is followed by the elements themselves (strings in this case). These elements can be scanned sequentially as well as indexed randomly when accessing information from the byte stream.

A list of lists is just a special case of this varying length list byte encoding. Each list is treated like a varying length value in forming the overall list.

Consider how the invention helps with a efficient keyed access. Suppose the problem is to access the table of "temperatures" from the byte stream and then look up the temperature in "arizona." Area one can be scanned sequentially-with high efficiency, determining that the "temperatures" row in the table is the second row. We then access the second element in the second area randomly, finding the offset of its value, which is ("arizona" "alaska"). Scanning this sequentially, we find that "arizona" is the first element. We then access the third area with the successive indices just computed and go quickly to the highlighted element in (22 14 32)(<u>89</u>27). Only the desired value (89) is actually deserialized from the byte stream.

The invention accommodates dynamically typed information by treating dynamically typed areas as if they were scalars. The invention can be employed recursively to encode the dynamically typed areas. The invention accommodates recursive schemas by treating self-referential areas of the schema as if they were dynamically typed areas with a completely new schema and then using itself recursively to encode said areas. The invention accommodates variants-by treating them as if they were dynamically typed areas, if necessary. The invention can be employed recursively to encode the variant case that is actually present in the message after recording a tag that indicates which case is present. The type isomorphism that allows tuples to be distributed over variants can also be employed to move as many variants as possible to the top-level of the schema, which maximizes the invention's scope for producing highly efficient results.

BRIEF DESCRIPTION OF THE DRAWINGS

The invention and its embodiments will be more fully appreciated by reference to the following detailed description of advantageous but nonetheless illustrative embodiments in accordance with the present invention when taken in conjunction with the accompanying drawings., in which:

FIG. 7 shows the result of applying the serialization process to the information structure of FIG. 6.

DETAILED DESCRIPTION OF THE INVENTION

The invention assumes that information structures are described by schemas, which is a common practice. Schemas can be represented in computer memory as rooted directed graphs whose leaf nodes represent scalar data types or dynamic type (the latter meaning that any type of information may be present) and whose interior nodes represent data structures such as tuples, lists, and variants. A list node has exactly one child, a tuple or variant node has one or more children. Cycles in the graph represent recursive definitions in the schema; a non-recursive schema's graph representation will be a tree.

To employ the invention, the schema's graph representation must be simplified to a tree representation by truncating recursive definitions and replacing them with dynamic type (which is represented by a leaf node in the truncated schema). The invention may then be employed recursively to serialize the recursive definition as if it were of dynamic type.

To employ the invention, the schema's tree representation must be made free of variants. Variants may be changed to dynamic type, which become leaves of a truncated schema as with recursive definitions. The invention may then be employed recursively to serialize the particular case of the variant that arises in the information structure as if it were of dynamic type. An optional schema reorganization process is presented later in this description showing how the effectiveness of the invention can be improved in the presence of variants.

Figure 1:
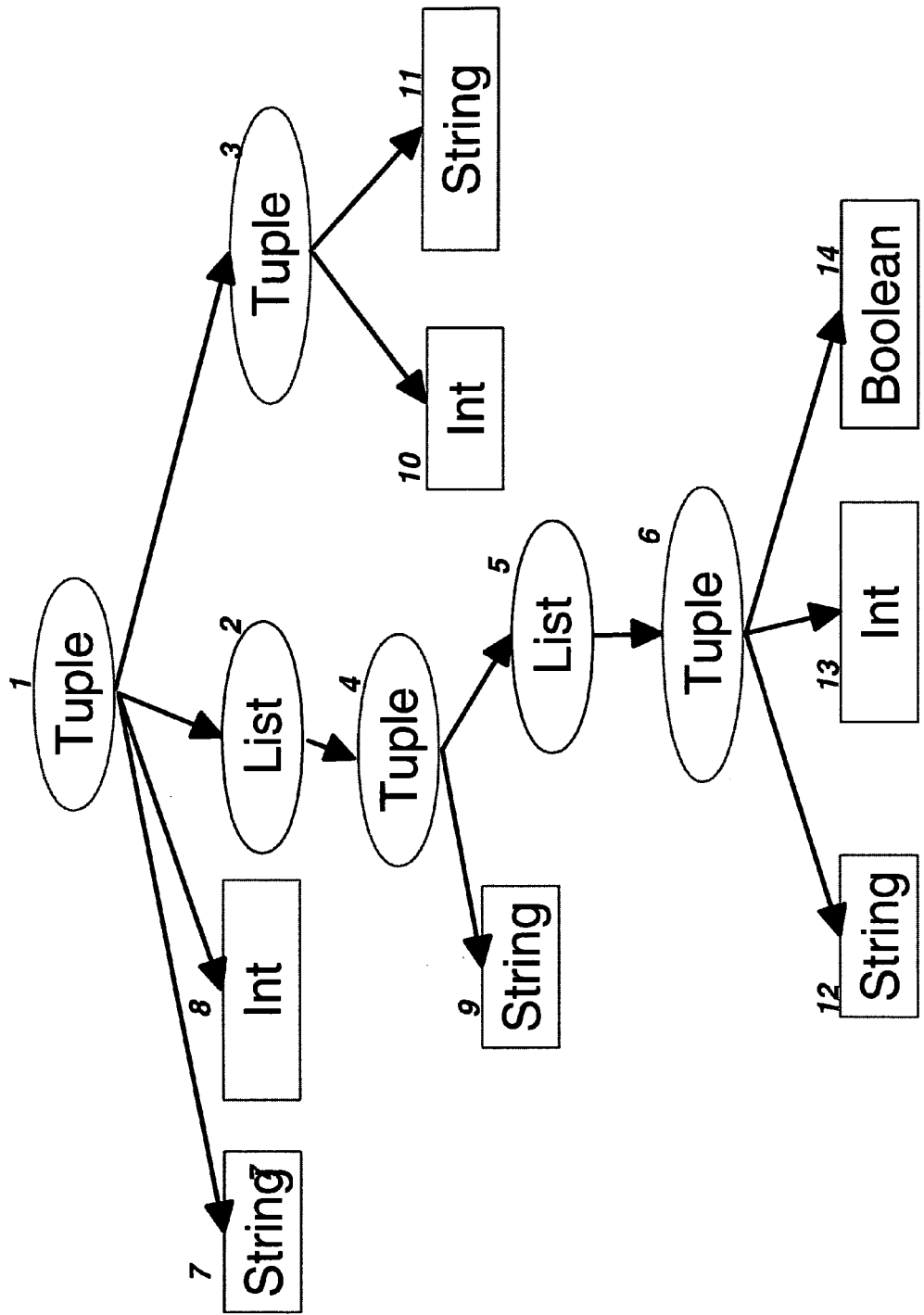
FIG. 1 shows an example of a tree representation of a schema as required by the invention.

An example of a schema tree representation is shown in FIG. 1. The arrows of FIG. 1 show the classic parent-child relationship that is present in any tree. Nodes 1 through 6 are interior nodes representing tuples (nodes 1, 3, 4, and 6) or lists (nodes 2, and 5). Nodes 7 through 14 are leaf nodes representing integers (nodes 8, 10, and 13), strings (nodes, 7, 9, 11, and is the sole case in this example). The example does not include any dynamic type leaf nodes.

To use the invention, a repertoire of scalar data types is chosen that will be accepted as leaf schema nodes. Once that choice is made, the invention supports all possible schemas made up of list nodes, tuple nodes, and the scalar data types plus dynamic type as leaf nodes. As noted above, such schemas can be derived from more complex schemas containing recursion and variants by truncating the schema and replacing the truncated portions with dynamic type leaves.

To use the invention, a method is chosen to encode values of each scalar data type as a sequences of bytes. Each such byte encoding should have fixed length if that is both possible and efficient, a variable-length encoding otherwise.

If a variable length byte encoding is employed, the encoding should provide a way of knowing where one encoded item ends and the next begins. A standard technique (not necessarily the only one) is to begin a variable length encoding with its length.

To use the invention, a method is chosen to encode schema tags that efficiently denote schemas. Information of dynamic type is encoded by encoding its schema tag and then using the invention recursively to encode the information of dynamic type. The resulting encoding is necessarily a variable length encoding.

In this description, only int, string, and boolean scalar data types are mentioned but the invention is not restricted to that scalar data type repertoire, or any other. This embodiment employs fixed length byte encodings for int and boolean values that are four bytes and one byte, respectively, and a variable length encoding for string values. These choices are not essential to the invention.

The invention also requires a way of encoding non-negative integers that are used as lengths and offsets. In this embodiment we employ four-byte big-endian integers. However, that particular choice is not essential to the invention.

The invention assumes that all information structures to which the invention will apply have an in-memory representation which is a tree. For each node in the in-memory representation, it is possible to find a corresponding node in the schema tree representation that gives its type.

The invention comprises three interrelated processes, which together, deliver the goal of efficient random and keyed access to byte stream contents. A fourth, optional, process may be used to reorganize a schema containing variants so as to more effectively exploit the invention.

1. A process for computing a layout from a schema tree representation. A layout guides the serialization of all information structures conforming to said schema. Serialization (a term familiar to those skilled in this art) means the formation of the byte stream from the in-memory representation. The layout computation need be done only once for each schema and need not (should not) be redone each time an information structure conforming to that schema is serialized.

2. A process for serializing the byte stream, input to comprise of the layout and the in-memory representation, output to comprise of a byte stream. The serialization process occurs only when an in-memory representation exists and a byte stream representation of the same information is desired. In messaging, for example, this would happen in computers that originate messages and would not typically be redone in computers that are merely routing the message.

3. A process for efficiently accessing any scalar value from within the serialized byte stream without deserializing surrounding parts of the byte stream (to those skilled in this art, deserialization means forming an in-memory representation from a byte stream, the inverse of serialization). The access process provides the real benefit of the invention, but the other two processes are necessary in support of this goal.

4. (Optional) A process for reorganizing a schema into possibly several schemas so that the number of variants to be changed to dynamic type is reduced and the effectiveness of the invention is increased.

The rest of this description covers the three processes plus the fourth optional process.

The Layout Computation Process

The process for computing the layout comprises three steps.

Step 1. Assign two values defined as follows to each leaf node in the schema. Both values can be assigned in a single depth-first left-right traversal of the schema.

1. A consecutive increasing field number is assigned to each leaf node encountered, in depth-first left-right order.

2. A path is assigned to each leaf node showing the sequence of interior nodes that reaches that leaf from the root of the schema. If every node has a distinct machine address (as is usual with this form of representation), it is sufficient to record the sequence of machine addresses that constitute the path.

Figure 2:
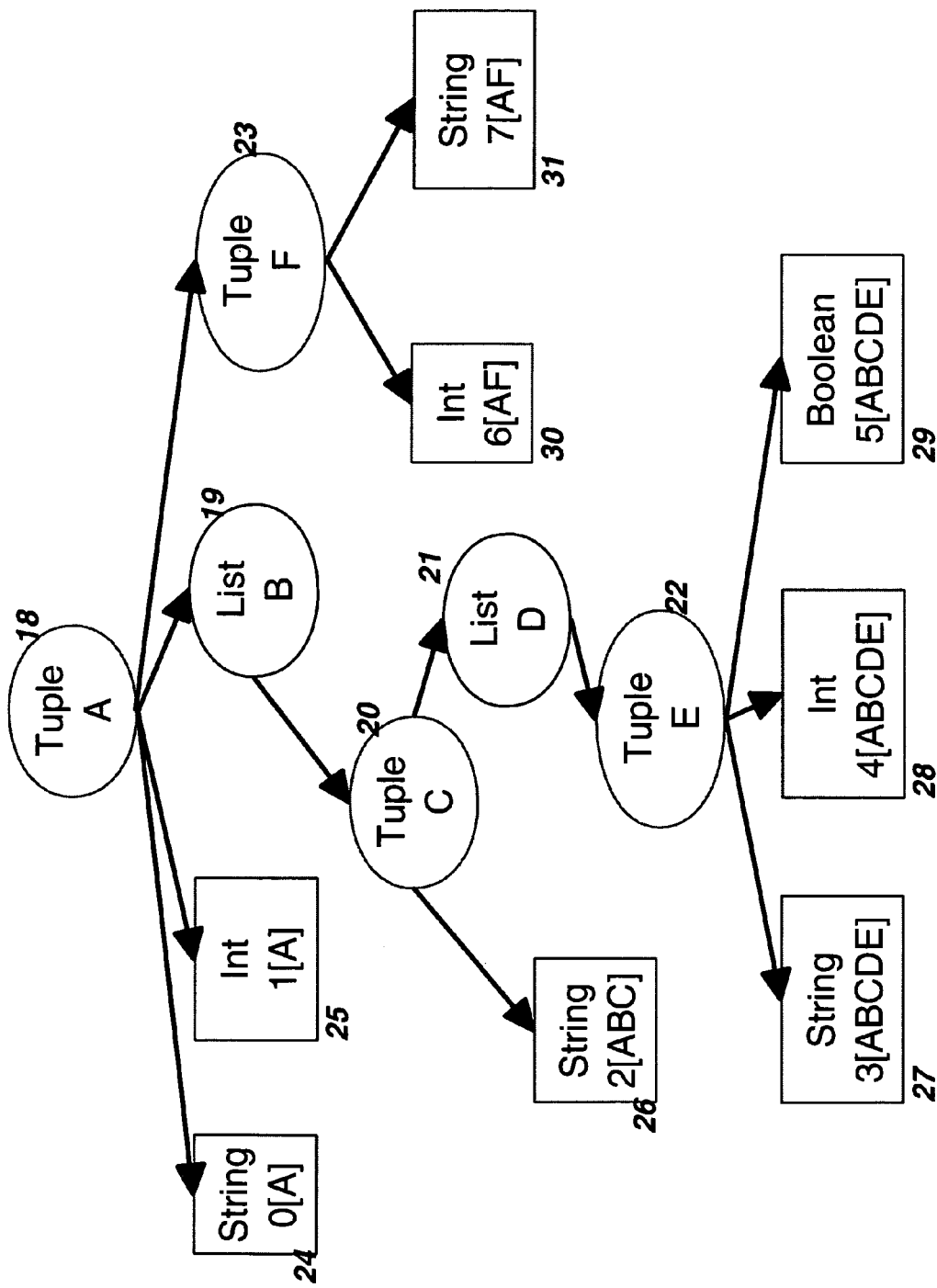
FIG. 2 shows the schema of FIG. 1 with the nodes augmented to show some aspects of a byte stream layout. The computation of a layout is the first of three processes that constitute the invention.

FIG. 2 shows the schema of FIG. 1 after step one of the layout computation process has been carried out. The interior nodes labeled 18 through 23 are assigned unique letter codes A through F only to show that each has a unique machine address. The field numbers assigned by this step in the process are shown as unbracketed numbers in each leaf node in FIG. 2. The field numbers 0 through 7 have been assigned to the nodes labeled 24 through 31, respectively. The paths are shown as bracketed sequences of letters representing machine addresses of interior nodes. For example, the node labeled 28 has the path [ABCDE] because the path to that node starting with the root encompasses exactly the interior nodes 18 through 22 and the letters A through E represent their machine addresses, respectively.

Step 2. Construct a template (hereafter called the layout) that will apply to the byte stream form of every information structure conforming to the schema. The layout calls for two byte stream portions, a fixed length portion, to come first, and a variable length portion, to follow immediately thereafter.

The fixed length portion always has a predictable length, and is divided into slots, each of which has a predictable length. Thus, every slot in the fixed length portion is at a known offset from the start of the byte stream. The start of the variable length portion is at a known offset from the start of the byte stream, but offsets to information within the variable length portion may vary among byte streams using the same layout, depending on the number of bytes occupied by byte encodings earlier in the variable length portion.

This description provides two alternative styles that layouts may follow. The first represents a well-known approach to handling mixtures of fixed-length and varying length fields similar to what is done by compilers for programming languages and by some DBMSs. The second style is equally efficient and has the occasionally useful property that the fixed length portion contains only offsets instead of a mixture of offsets and data.

Layout Style 1. In this style, the fixed length portion of the byte stream has one fixed length slot for each field number computed in step 1, in order of ascending field numbers.

For each leaf node whose paths contain no lists and whose scalar data type has a fixed length encoding, information corresponding to that leaf node will be serialized directly into the fixed length slot corresponding to that node's field number.

For each leaf node whose paths contain lists and/or whose scalar data type has a variable length encoding, the fixed length slot corresponding to that node's field number will contain an offset into the variable length portion and information corresponding to that leaf node will be serialized at that point in the variable length portion.

Figure 3:
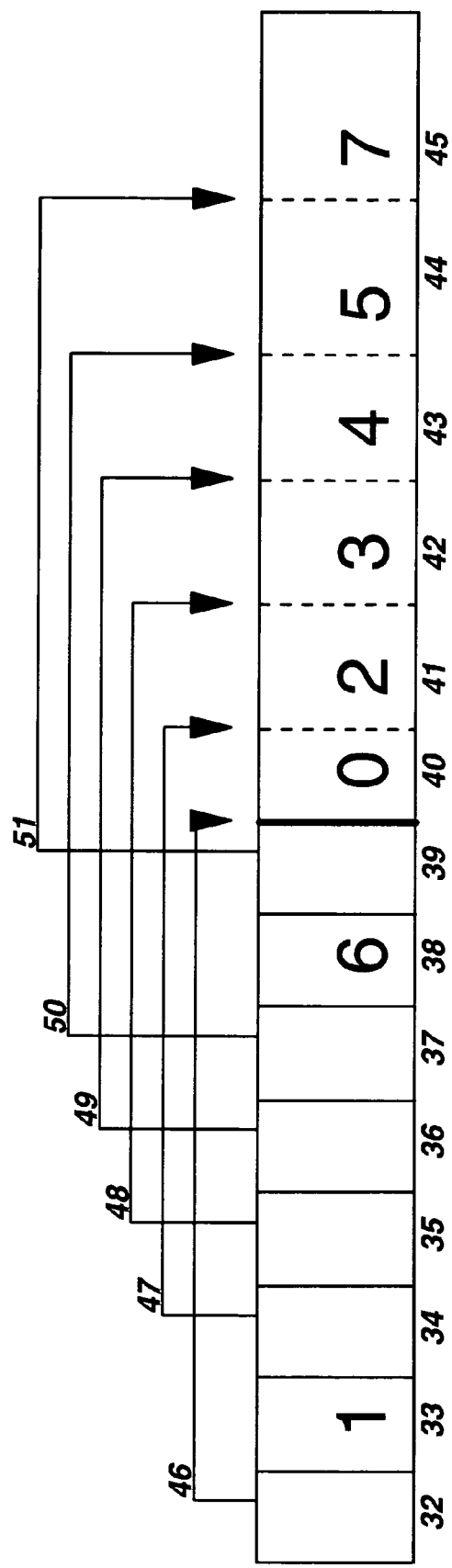
FIG. 3 shows one way of completing a layout for the example schema.

FIG. 3 shows the layout constructed in style 1, using the example schema of FIG. 1 as numbered in FIG. 2. Slots 32 through 39 correspond to field numbers 0 through 7, respectively. Fields 1 and 6 are fixed length and hence will be encoded in their slots (33 and 38) in the fixed length portion. The other fields will be encoded in the variable length portion, with field 0 serialized as shown in a range of bytes labeled 40, field 2 in a byte range labeled 41, field in a byte range labeled 42, field 4 in a byte range labeled 43, field 5 in a byte range labeled 44, and field 7 in a byte range labeled 45. The arrows labeled 6 through 51 represent offsets. The slots labeled 32, 34, 35, 36, 37, and 39 contain the offsets of the beginnings of byte ranges labeled 40, 41, 42, 43 44, and 45, respectively.

Layout Style 2. All of the fields numbered in step 1 will be encoded in the varying length portion, consecutively in ascending order of field number, no matter whether the fields are of fixed or varying length. The fixed length portion will contain one offset slot for each field that follows a varying length field. The fixed length portion comprises only of these needed offset slots. For this purpose, a field has varying length if its path contains lists and/or the scalar data type from the schema has a variable length encoding.

Figure 4:
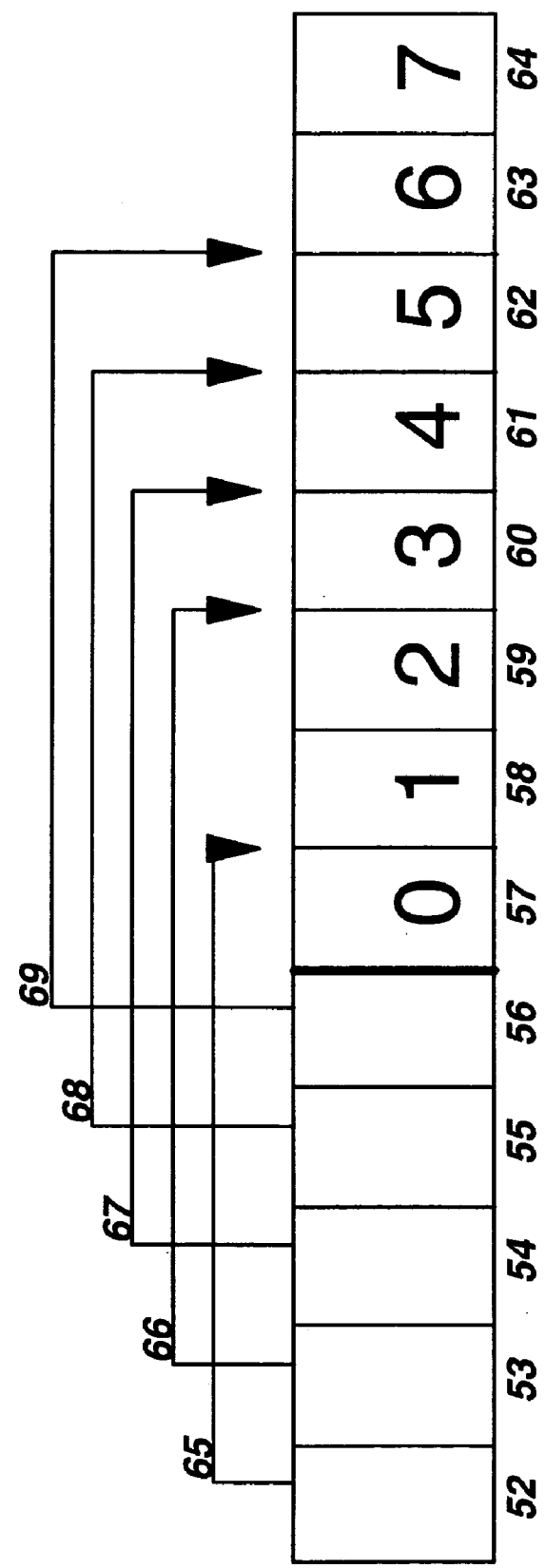
FIG. 4 shows an alternative way of completing a layout for the example schema.

FIG. 4 shows a layout constructed in style 2, using the same example as with previous Figures. Fields 1, 3, 4, 5, and 6 follow fields with variable length encodings, hence they require offset slots in the fixed length portion of the byte stream. The five offset slots labeled 52 through 56 are reserved in the fixed length portion. The variable length portion contains byte ranges labeled 57 through 64, containing the serialized information for fields 0–7 respectively. Field 0 doesn't follow any field, and fields 2 and 7 follow fixed length fields. Hence, their offsets are not be recorded in the fixed length portion. They either have a known offset already or their offset can be calculated from the offset of a previous field (which is recorded). The arrows labeled 65 through 69 convey the fact that the offsets in slots labeled 52 through 56 are to the beginnings of the byte ranges labeled 58, 60, 61, 62, and 63, respectively, in which are serialized the information for fields 1, 3, 4, 5, and 6, respectively.

Step 3. The information computed in the two previous steps is organized for efficient lookup by field number. That is, given a field number, one can quickly find its leaf node in the schema (hence its data type and path) and also its place in the layout. This can be done by recording appropriate machine addresses and other information in an array indexed by field number.

The Serialization Process

The process for forming a byte stream from an in-memory representation is called serialization. The serialization process has a sub-process structure shown in FIG. 5.

The serialization master sub-process (labeled 70) sequences the process as a whole. It invokes, as needed, (1) a sub-process for non-list values (labeled 72) and (2) a sub-process for list values (labeled 74).

The list sub-process invokes, as needed, (1) a sub-process for fixed length items (labeled 76), (2) a sub-process for variable length items that are not lists (labeled 78), and (3) a sub-process for nested list items (labeled 80), which, in turn, recursively invokes the list sub-process.

The directed arrows 71, 73, 75, and 77 indicate invocation of one sub-process by another, with the sub-process at the point of the arrow returning eventually to its invoker. The bi-directional arrow 79 indicates that the processes labeled 74 and 80 can invoke each other. However, each such invocation eventually returns to the invoking process.

Our description of the serialization process describes in-memory representations of information structures, and then details the steps carried out by each sub-process In-memory Representations of Information Structures.

In any application of this invention, there will be some representation for information structures in computer memory.

Since information structures conform to tree-like schemas, we assume that a tree-like in-memory representation of those information structures is always possible. In the case of messages, tree like representations are the norm.

For example, the DOM standard from W3C, or the JAXB standard from Javasoft, specify tree-like representations, as does the SDO representation proposed by IBM and BEA. The details of the representation are unimportant, but all such representations have common elements.

All in-memory representations conforming to a particular schema will have nodes whose types correspond to nodes in said schema's tree representation, as follows.

1. Scalar values in the in-memory representation and dynamically typed nodes correspond to leaf schema nodes designating the data type of the value. For example, an integer 3 might correspond to an int schema node, the string "charles" might correspond to a string schema node, the truth value false might correspond to a b olean schema node, etc.

2. Heterogeneous container nodes (such as Java beans) in the in-memory representation correspond to tuple nodes in the schema. For example, a bean with int and string fields corresponds to a tuple in the schema whose children are int and string leaf nodes.

3. Homogeneous container nodes (such as lists, arrays, or sets) in the in-memory representation correspond to list nodes in the schema. For example, an array of strings corresponds to a list node in the schema whose child is a string leaf node.

Correspondence is, in general, many-to-one. That is, more than one node in the in-memory representation can correspond to the same node in the schema.

Some tree representations (e.g. DOM) don't clearly distinguish between homogeneous and heterogeneous collections. However, when the schema is available, the distinction can be reconstructed (see step 1 of the serialization master sub-process).

Figure 6:
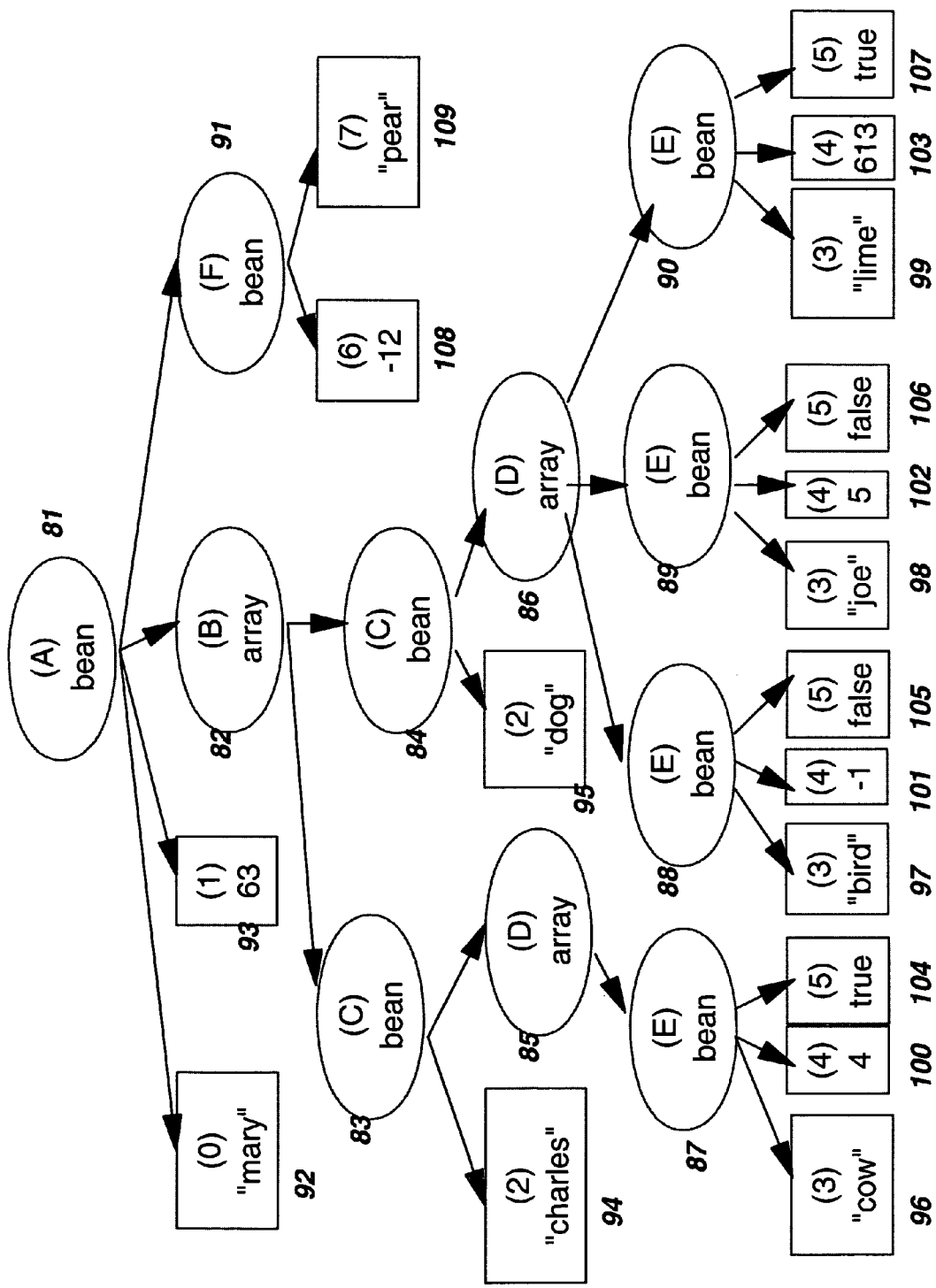
FIG. 6 shows a the in-memory representation of an information structure as a tree, where the information structure conforms to the example schema. It is used to guide a detailed example of the serialization process.

FIG. 6 shows an in-memory representation of an information structure that conforms to the schema introduced in FIGS. 1 and used in the layout computation examples of FIG. 2 through 4. The nodes in FIG. 6 are annotated with the parenthesized field numbers (for scalar data values) or node letters (for bean and array nodes) taken from FIG. 2. This shows the correspondence between nodes of an in-memory representation and the nodes in its schema tree representation. More precisely characterizing the nodes in FIG. 6:

the node labeled 81 corresponds to the node labeled 18 in FIG. 2, as indicated by the address (A);

the node labeled 82 corresponds to the node labeled 19 in FIG. 2, as indicated by the address (B);

the nodes labeled 83 and 84 correspond to the node labeled 20 in FIG. 2, as indicated by the address (C) recorded in both;

the nodes labeled 85 and 86 correspond to the node labeled 21 in FIG. 2, as indicated by the address (D) recorded in both;

the nodes labeled 87 through 90 correspond to the node labeled 22 in FIG. 2, as indicated by the address (E) recorded in all of them;

the node labeled 91 corresponds to the node labeled 23 in FIG. 2, as indicated by the address (F);

the node labeled 92 corresponds to the node labeled 24 in FIG. 2, as indicated by the field number (0);

the node labeled 93 corresponds to the node labeled 25 in FIG. 2, as indicated by the field number (1);

the nodes labeled 94 and 95 correspond to the node labeled 26 in FIG. 2, as indicated by the field number (2) recorded in both;

the nodes labeled 96 through 99 correspond to the node labeled 27 in FIG. 2, as indicated by the field number (3) recorded in all of them;

the nodes labeled 100 through 103 correspond to the node labeled 28 in FIG. 2, as indicated by the field number (4) recorded in all of them;

the nodes labeled 104 through 107 correspond to the node labeled 29 in FIG. 2, as indicated by the field number (5) recorded in all of them;

the node labeled 108 corresponds to the node labeled 30 in FIG. 2, as indicated by the field number (6); and the node labeled 109 corresponds to the node labeled 31 in FIG. 2, as indicated by the field number (6).

The term bean in the diagram should be understood to represent any heterogeneous container, not necessarily literally a Java bean. The term array, similarly, represents any homogeneous collection that supports a determination of its size and iteration over its elements. Different in-memory representations will use different object types to represent aspects of the information structure but the invention applies to all possible choices of representation using parent-child relationships, and heterogeneous or homogeneous collections, as described herein.

The Serialization Master Sub-Process.

Figure 5:
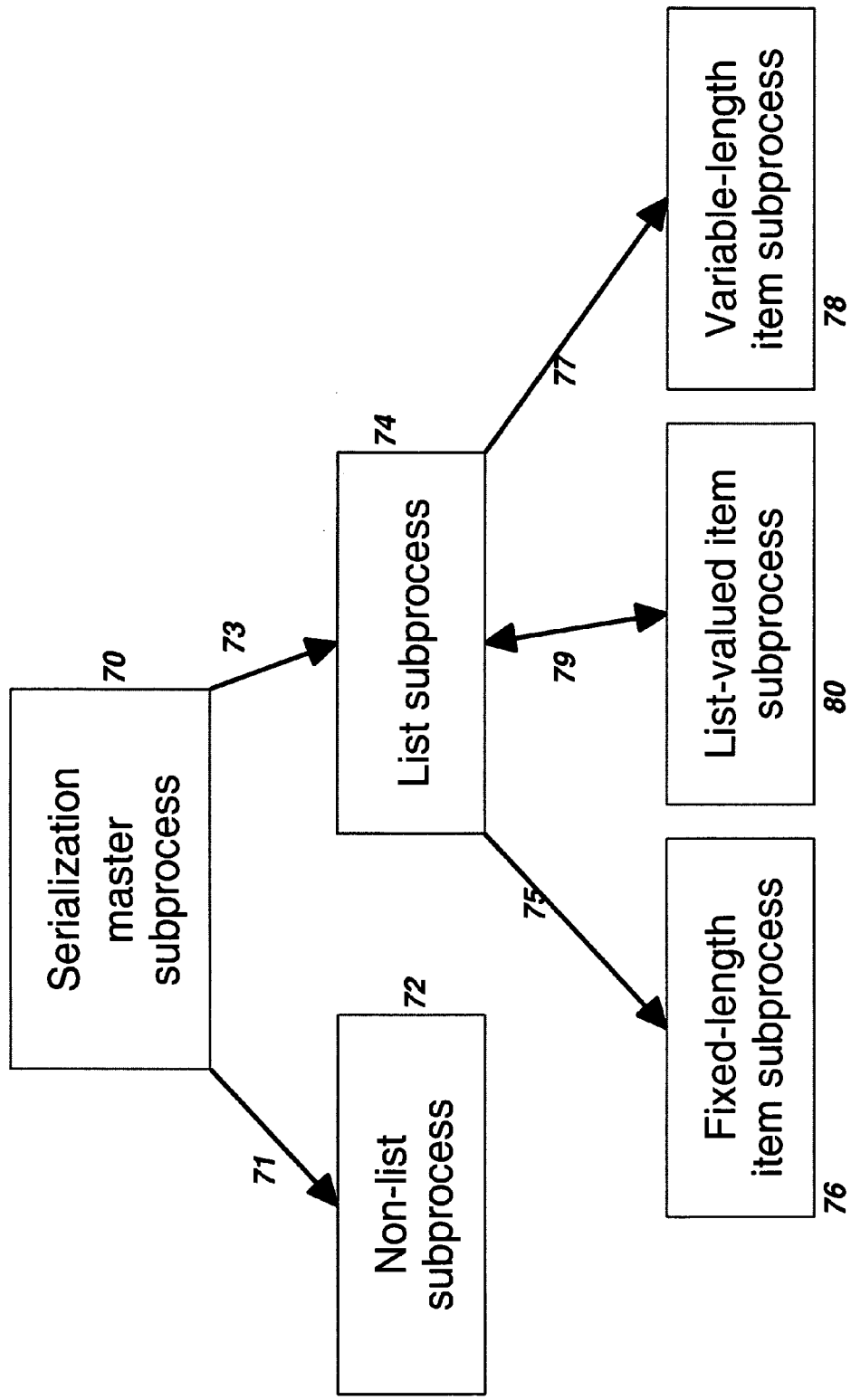
FIG. 5 shows the sub-process structure of the serialization process, which is the second of the three processes constituting the invention.

The serialization master sub-process labeled 70 in FIG. 5 comprises 6 steps.

Step 1. The correspondence between the in-memory representation and its schema tree representation is determined.

In some cases (for example, SDO), this correspondence is given a priori (nodes in the in-memory representation are specialized objects that point to their schema node).

In other cases (for example DOM), this correspondence can be computed by available tools (the XML Schema standard from W3C defines validating parsers which, in addition to validating that an information structure conforms to its schema, compute a post-validation infoset that makes explicit the correspondence of elements of the DOM tree to the schema).

FIG. 6 can be taken as illustrating the end point of this step, in which the parenthesized letters denoting the machine addresses of interior schema nodes and the parenthesized field numbers denoting the addresses of leaf schema nodes show the correspondence to the schema in FIG. 2.

For the remaining steps, we assume that the schema is available. If the layout computation has not been performed on the schema before this moment, it is performed now. For the remaining steps, we assume that a layout is available governing all byte streams that serialize information structures conforming to this schema.

Step 2 Using the layout, the byte stream is initialized by reserving the fixed length portion (assigning memory to it without yet specifying its contents) and recording the address of the beginning of the variable length portion, which will grow by appending bytes to the end. This pointer to the beginning of the variable length portion is called the current encoding point and will be incremented by other steps so as to always point to the end of material that has already been encoded in the variable length portion.

Step 3. The sub-process iterates through the field numbers (in increasing order) that were assigned in the layout computation process. Steps 4 and 5 are carried out for each field number.

Step 4 (repeated by step 3). The location for the field in the byte stream is looked up in the layout. If that location is in the variable length portion, the place to encode the field is always the current encoding point. This assumption is sound because both layout styles encode varying length fields in increasing field number order.

If that location is in the variable length portion, and the layout calls for its offset to be recorded in a fixed length slot, then the current encoding point is converted to an offset from the start of the variable length portion and that offset is stored in the fixed length slot as called for by the layout.

Step 5 (repeated by step 3). If the field's path contains no list node, the single scalar value in the in-memory representation for that field is encoded by the non-list sub-process (arrow 71 to box 72 in FIG. 5). Otherwise, the potentially many scalar values for the field are encoded by the list sub-process (arrow 73 to box 74 in FIG. 5) Both of these subprocesses increment the current encoding point.

Step 6. The final value of the current encoding point, minus the start of the byte stream, gives the length of the byte stream. Serialization is complete.

(end of master sub-process).

The Non-List Sub-Process.

This sub-process is invoked for a particular field in the layout that has no list in its path. The layout will dictate where in the byte stream the single scalar value for the field should be encoded, as determined in the master sub-process, step 4. This will either be a fixed length slot or the current encoding point. The sub-process has three steps.

Step 1. The path computed as part of the layout indicates how to navigate through the in-memory representation to find the scalar value to be encoded. Since there are no list nodes in the path, this navigation yields a single value. The scalar value to be encoded is accessed by following the path through the in-memory representation.

Step 2. The value found in step 1 is encoded into the byte stream location that was determined in by the master sub-process, step 4. The encoding algorithm for all supported scalar data types was supplied by the user of the invention and is not intrinsic to the invention.

Step 3. If the current encoding point was used, it is incremented by the number of bytes it took to perform the encoding in step 2.

(end of non-list sub-process)

The List Sub-process.

The list sub-process can be invoked by the master sub-process (arrow 73 in FIG. 5) or recursively via the list-valued item sub-process as indicated by the two-way arrow labeled 79 in FIG. 5. In addition to being invoked for a particular field in the layout, each invocation has, as an argument, a starting node within the in-memory representation. When the list sub-process is invoked from the master sub-process, the starting node is the root node of the in-memory representation. When the sub-process is invoked from the list-valued item sub-process, the starting node will be an interior node within the in-memory representation whose parent is a homogeneous collection.

No matter the layout style, all lists will be encoded in the variable length portion of the byte stream because lists have intrinsically varying length.

The list sub-process has 6 steps.

Step 1. Increment the current encoding point by four bytes to leave room to record the overall length of the list (to be recorded in step 6). The previous value of current encoding point is remembered as lengthLocation and the new value as sizeLocation. Note: recording the length of every list at the start of the list is done so that the start and end of each list will be unambiguous when scanning the byte stream, which is considered good practice. No part of the invention as described herein actually requires this to be done, so this step is not intrinsic to the invention.

Step 2. Find the schema node within the field's path that corresponds to the starting node. This will be the first node when the list sub-process is invoked from the master sub-process. It will be a node immediately following a list node in the path otherwise.

Step 3. Navigate the in-memory representation from the starting node, using a suffix of the path starting at the node found in step 2, until the next homogeneous collection node in the in-memory representation (corresponding to a list node in the path) is encountered. Record the residual path which is the part of the path after the list node that was matched in this step. The residual path may be empty.

Step 4. Determine the size of the homogeneous collection node that was navigated to in step 3 (the number of items in the collection). Record this size as a big-endian four-byte integer at the current encoding point and increment the current encoding point by four bytes.

Step 5. Perform one of three possible actions.

1. If the residual path from step 3 contains any list node, then perform the list-valued item sub-process (arrow 79 to box 80 in FIG. 5).

2. Otherwise (the residual path contains no list nodes), if the scalar data type of the field requires a variable length encoding, perform the variable-length item sub-process (arrow 77 to box 78 in FIG. 5).

3. Otherwise (the residual path contains no list nodes and the scalar data type of the field has a fixed length encoding), perform the fixed-length item sub-process (arrow 75 to box 76 in FIG. 5).

Step 6. Subtract sizeLocation from the current encoding point and record the result at lengthLocation. This causes the list to be preceded in the byte form by its length in bytes. As noted above, doing is this is not intrinsic to the invention but is considered good practice.

(end of list sub-process)

The Fixed-length Item Sub-process.

The fixed-length item sub-process is entered with a homogeneous collection and a residual path, both determined in step 3 of the list sub-process. The fixed-length item sub-process iterates through the collection, performing the following sequence of 3 steps on each item in the collection.

Step 1 (iterated). The residual path is used to navigate from the item from the collection (a node within the in-memory representation) to a scalar value.

Step 2 (iterated). The scalar value is encoded at the current encoding point according to its type (in this sub-process that will always be a fixed-length encoding).

Step 3 (iterated). The current encoding point is incremented by the length of the encoding.

(end of fixed-length item sub-process)

The Varying-length Item Sub-process.

This sub-process is entered with a homogeneous collection and a residual path, both determined in step 3 of the list sub-process. The varying-length item sub-process comprises the following 6 steps.

Step 1. The number of items in the collection is multiplied by four and the current encoding point is incremented by the resulting amount, leaving room for an offset table with as many entries as there are items in the list. Two values called firstOffset and nextOffset point to the start of this offset table.

Step 2. The sub-process iterates through the collection, performing the remaining steps on each item.

Step 3 (repeated by step 2). The current encoding point, minus firstOffset is recorded at nextOffset and nextOffset is incremented by four. This creates an entry in the offset table that was created in step 1.

Step 4 (repeated by step 2). The residual path is used to navigate from the item of the collection selected by step 2 (a node in the in-memory representation) to a scalar value.

Step 5 (repeated by step 2). The scalar value is encoded at the current encoding point according to its type (in this sub-process that will always be a variable-length encoding).

Step 6 (repeated by step 2). The current encoding point is incremented by the length of the encoding produced in step 5.

(end of variable-length item sub-process)

The List-valued Item Sub-process.

This sub-process is entered with a homogeneous collection and a residual path, both determined in step 3 of the list sub-process. It comprises four steps, the first three of which are identical to the variable-length item sub-process.

Step 1. The number of items in the collection is multiplied by four and the current encoding point is incremented by the resulting amount, leaving room for an offset table with as many entries as there are items in the list. Two values called firstOffset and nextOffset point to the start of this offset table.

Step 2. The sub-process iterates through the collection, performing the remaining steps on each item.

Step 3 (repeated by step 2). The current encoding point, minus firstOffset is recorded at nextOffset and nextOffset is incremented by four. This creates an entry in the offset table that was created in step 1.

Step 4 (repeated by step 2). The list sub-process is invoked recursively, with its starting node set to the particular collection item iterated to in step 2. This causes the list to be encoded at the current encoding point and increments the current encoding point appropriately.

EXAMPLE

The entire byte stream resulting from serializing the in-memory representation in FIG. 6 is shown in FIG. 7. Layout style 2 (shown in FIG. 4) was employed.

In FIG. 7, the byte stream is shown broken into five rows of information so as to fit the page. In reality, it is a contiguous array of bytes. Each box in the Figure (labeled successively as 200 through 254) represents some number of contiguous bytes in the byte stream. The text uppermost in each box gives the type of information encoded there and (directly or implicitly) the number of bytes occupied by the information. The text lowermost in each box gives the actual contents, not "byte-by-byte" but in a format designed to facilitate understanding. More specifically, an O in a box indicates offset information, said offset information consuming four bytes of the byte stream;

an L in a box indicates the length of the following list in bytes, said length consuming four bytes of the byte stream (recording list lengths is not essential to the invention but is considered good practice and is done by this embodiment);

an S in a box indicates a list size (number of items) of a list, said list size consuming four bytes in the byte stream; and a D in a box indicates serialized data from the in-memory representation, said data consuming the number of bytes in the byte stream indicated next to the D.

The following walk-through of the serialization process for this example should make clear how the individual elements of the serialization are generated.

A Walk-through of the Example

This walk-through relates elements of the byte stream shown in FIG. 7 to steps in the subprocesses of FIG. 5 by walking through the steps, spanning the various subprocesses, by which the in-memory representation shown in FIG. 6 was serialized to form the byte stream shown in FIG. 7.

Master sub-process begins (FIG. 5, label 70)

Master-1: relate in-memory representation to its schema (result shown in FIG. 6)

Master-2: initialize layout (reserves the five slots at the start of the byte stream labeled 200 through 204 in FIG. 7). These correspond to slots labeled 52 through 56 in FIG. 4). Current encoding point (start of variable length portion) is a start of 205 in FIG. 7.

Master-3: iterate through field numbers 0–7 performing steps 4 and 5.

Master-4(0): field 0 is in variable length portion (box 57 in FIG. 4), so serialization is at the current encoding point. No offset to record.

Master-5(0): non-list sub-process chosen (arrow 71 to box 72 in FIG. 5).

Non-list-1: navigate from node 81 to 92 in FIG. 6, based on the path recorded in node 24 in FIG. 2. The value is "mary"

Non-list-2: "mary" appears in result (205 in FIG. 7).

Non-list-3: current encoding point now at start of 206 in FIG. 7.

(End Non-list sub-process, return via arrow 71 to box 70 in FIG. 5).

Master-4(1): field 1 is in variable length portion (box 58 in FIG. 4) so serialization is at current encoding point. Offset of box 58 is in box 52 in FIG. 4 as shown by arrow 65, so the offset of the current encoding point from the start of the variable length portion (8 bytes) is recorded in box 200 in FIG. 7.

Master-5(1): non-list sub-process chosen (arrow 71 to box 72 in FIG. 5).

Non-List-1: navigate from node 81 to 93 in FIG. 6, based on the path recorded in node 25 in FIG. 2. The value is 63.

Non-List-2: 63 appears in result (206 in FIG. 7).

Non-List-3: current encoding point now at start of 207 in FIG. 7.

(End Non-list sub-process, return via arrow 71 to box 70 in FIG. 5).

Master-4(2): field 2 is in variable length portion (box 59 in FIG. 4), so serialization is at the current encoding point. No offset to record.

Master-5(2): list sub-process chosen (arrow 73 to box 74 in FIG. 5).

List-1: reserve bytes in box 207 of FIG. 7 and set lengthLocation to the start of those bytes, current encoding point and sizeLocation to the start of box 208.
List-2: starting node is node 81 in FIG. 6.
List-3: first homogeneous collection in path (see node 26 in FIG. 2) corresponds to node 82 in FIG. 6.
List-4: record size of collection (2) in box 208, FIG. 7. Current encoding point is now start of 209, FIG. 7.
List-5: Variable-length item sub-process chosen (arrow 77 to box 78 in FIG. 5).
Var-item-1: two-slot offset table reserved (boxes 209 and 210 in FIG. 7). Both firstOffset and nextOffset point to start of 209. Current encoding point is now at start of box 211.
Var-item-2: iterate remaining steps for the members of the array node 82; these are nodes 83 and 84.
Var-item-3(0): record offset in slot at nextOffset, which is box 209. The value is current encoding point minus firstOffset which is 8 bytes. NextOffset is now at the start of box 210.
Var-item-4(0): Residual path is [C] (see node 26 in FIG. 2), so navigate from node to node 94 in FIG. 6. The value is "charles".
Var-item-5(0): "charles" appears in result (211 in FIG. 7).
Var-item-6(0): current encoding point is now at 212 in FIG. 7.
Var-item-3(1): record offset in slot at nextOffset, which is box 210. The value is current encoding point minus firstOffset which is 19 bytes. NextOffset is now at the start of box 211.
Var-item-4(1): Residual path is [C] (see node 26 in FIG. 2), so navigate from node to node 95 in FIG. 6. The value is "dog"
Var-item-5(0): "dog" appears in result (212 in FIG. 7).
Var-item-6(0): current encoding point is now at 213 in FIG. 7.
(End Variable-item sub-process, return via arrow 77 to box 74 in FIG. 5).
List-6: length of list (30 bytes) recorded in at lengthLocation (box 207).
(End List sub-process, return via arrow 73 to box 70 in FIG. 5).
Master-4(3): field 3 is in variable length portion (box 60 in FIG. 4) so serialization is at current encoding point. Offset of box 60 is in box 53 in FIG. 4 as shown by arrow 66, so the offset of the current encoding point from the start of the variable length portion (46 bytes) is recorded in box 201 in FIG. 7.
Master-5(3): list sub-process chosen (arrow 73 to box 74 in FIG. 5).
List-1: reserve bytes in box 213 of FIG. 7 and set lengthLocation to the start of those bytes, current encoding point and sizeLocation to the start of box 214.
List-2: starting node is node 81 in FIG. 6.
List-3: first homogeneous collection in path (see node 27 in FIG. 2) corresponds to node 82 in FIG. 6.
List-4: record size of collection (2) in box 214, FIG. 7. Current encoding point is now start of 215, FIG. 7.
List-5: List-valued item sub-process chosen (arrow 79 to box 80 in FIG. 5).
List-val-item-1: two-slot offset table reserved (boxes 215 and 216 in FIG. 7). Both firstOffset and nextOffset point to start of 215. Current encoding point is now at start of box 217.
List-val-item-2: iterate remaining steps for the members of the array node 82; these are nodes 83 and 84.
List-val-item-3(0): record offset in slot at nextOffset, which is box 215. The value is current encoding point minus firstOffset which is 8 bytes. NextOffset is now at the start of box 216.
List-val-item-4(0): Recursively invoke the list sub-process (arrow 79 to box 74 in FIG. 7).
(Recursive) List-1: reserve bytes in box 217 of FIG. 7 and set lengthLocation to the start of those bytes, current encoding point and sizeLocation to the start of box 218.
(Recursive) List-2: starting node is node 83 in FIG. 6.
(Recursive) List-3: first homogeneous collection in the residual path [CDE] (see node 27 in FIG. 2) corresponds to node 85 in FIG. 6.
(Recursive) List-4: record size of collection (1) in box 218, FIG. 7. Current encoding point is now start of 219, FIG. 7.
(Recursive) List-5: Variable-length item sub-process chosen (arrow 77 to box 78 in FIG. 5).
Var-item-1: one-slot offset table reserved (box 219 in FIG. 7). Both firstOffset and nextOffset point to start of 219. Current encoding point is now at start of box 220.
Var-item-2: iterate remaining steps for the members of the array node 85; this comprises the single node 87.
Var-item-3(0): record offset in slot at nextOffset, which is box 219. The value is current encoding point minus firstOffset which is 4 bytes. NextOffset is now at the start of box 220.
Var-item-4(0): Residual path is [E] (see node 27 in FIG. 2), so navigate from node to node 96 in FIG. 6. The value is "cow".
Var-item-5(0): "cow" appears in result (220 in FIG. 7).
Var-item-6(0): current encoding point is now at 221 in FIG. 7.
(End variable-length item sub-process, return via arrow 77 to box 74).
(Recursive) List-6: length of list (15 bytes) recorded in at lengthLocation (box 217).
(End List sub-process recursive invocation, return via arrow 79 to box 80 in FIG. 5).
List-val-item-3(1): record offset in slot at nextOffset, which is box 216. The value is current encoding point minus firstOffset which is 27 bytes. NextOffset is now at the start of box 217.
List-val-item-4(1): Recursively invoke the list sub-process (arrow 79 to box 74 in FIG. 7).
(Recursive) List-1: reserve bytes in box 221 of FIG. 7 and set lengthLocation to the start of those bytes, current encoding point and sizeLocation to the start of box 222.
(Recursive) List-2: starting node is node 84 in FIG. 6.
(Recursive) List-3: first homogeneous collection in the residual path [CDE] (see node 27 in FIG. 2) corresponds to node 86 in FIG. 6.
(Recursive) List-4: record size of collection (3) in box 222, FIG. 7. Current encoding point is now start of 223, FIG. 7.
(Recursive) List-5: Variable-length item sub-process chosen (arrow 77 to box 78 in FIG. 5).
Var-item-1: three-slot offset table reserved (boxes 223 through 225 in FIG. 7). Both firstOffset and nextOffset point to start of 223. Current encoding point is now at start of box 226.
Var-item-2: iterate remaining steps for the members of the array node 85; these comprise of nodes 88, 89, and 90.
Var-item-3(0): record offset in slot at nextOffset, which is box 223. The value is current encoding point minus firstOffset which is 12 bytes. NextOffset is now at the start of box 224.

Var-item-4(0): Residual path is [E] (see node 27 in FIG. 2), so navigate from node to node 97 in FIG. 6. The value is "bird".
Var-item-5(0): "bird" appears in result (226 in FIG. 7).
Var-item-6(0): current encoding point is now at 227 in FIG. 7.
Var-item-3(1): record offset in slot at nextOffset, which is box 224. The value is current encoding point minus firstOffset which is 20 bytes. NextOffset is now at the start of box 225.
Var-item-4(1): Residual path is [E] (see node 27 in FIG. 2), so navigate from node to node 98 in FIG. 6. The value is "joe".
Var-item-5(1): "joe" appears in result (227 in FIG. 7).
Var-item-6(1): current encoding point is now at 228 in FIG. 7.
Var-item-3(2): record offset in slot at nextOffset, which is box 225. The value is current encoding point minus firstOffset which is 27 bytes. NextOffset is now at the start of box 226.
Var-item-4(2): Residual path is [E] (see node 27 in FIG. 2), so navigate from node to node 99 in FIG. 6. The value is "lime".
Var-item-5(2): "lime" appears in result (228 in FIG. 7).
Var-item-6(2): current encoding point is now at 229 in FIG. 7.
(End variable-length item sub-process, return via arrow 77 to box 74).
(Recursive) List-6: length of list (39 bytes) recorded in at lengthLocation (box 221).
(End List sub-process recursive invocation, return via arrow 79 to box 80 in FIG. 5).
(End List-valued-item sub-process, return via arrow 79 to box 74 in FIG. 5).
List-6: length of list (74 bytes) recorded in at lengthLocation (box 213).
(End List sub-process, return via arrow 73 to box 70 in FIG. 5).
Master-4(4): field 4 is in variable length portion (box 61 in FIG. 4) so serialization is at current encoding point. Offset of box 61 is in box 54 in FIG. 4 as shown by arrow 67, so the offset of the current encoding point from the start of the variable length portion (124 bytes) is recorded in box 202 in FIG. 7.
Master-5(4): list sub-process chosen (arrow 73 to box 74 in FIG. 5).
List-1: reserve bytes in box 229 of FIG. 7 and set lengthLocation to the start of those bytes, current encoding point and sizeLocation to the start of box 230.
List-2: starting node is node 81 in FIG. 6.
List-3: first homogeneous collection in path (see node 28 in FIG. 2) corresponds to node 82 in FIG. 6.
List-4: record size of collection (2) in box 230, FIG. 7. Current encoding point is now start of 231, FIG. 7.
List-5: List-valued item sub-process chosen (arrow 79 to box 80 in FIG. 5).
List-val-item-1: two-slot offset table reserved (boxes 231 and 232 in FIG. 7). Both firstOffset and nextOffset point to start of 231. Current encoding point is now at start of box 233.
List-val-item-2: iterate remaining steps for the members of the array node 82; these are nodes 83 and 84.
List-val-item-3(0): record offset in slot at nextOffset, which is box 231. The value is current encoding point minus firstOffset which is 8 bytes. NextOffset is now at the start of box 232.

List-val-item-4(0): Recursively invoke the list sub-process (arrow 79 to box 74 in FIG. 7).
(Recursive) List-1: reserve bytes in box 233 of FIG. 7 and set lengthLocation to the start of those bytes, current encoding point and sizeLocation to the start of box 234.
(Recursive) List-2: starting node is node 83 in FIG. 6.
(Recursive) List-3: first homogeneous collection in the residual path [CDE] (see node 27 in FIG. 2) corresponds to node 85 in FIG. 6.
(Recursive) List-4: record size of collection (1) in box 234, FIG. 7. Current encoding point is now start of 235, FIG. 7.
(Recursive) List-5: Fixed-length item sub-process chosen (arrow 75 to box 76 in FIG. 5). Steps will be iterated only once since node 85 has only one child.
Fixed-item-1(0): Residual path is [E] (see node 28 in FIG. 2), so navigate from node 87 to node 100 in FIG. 6. The value is 4.
Fixed-item-2(0): 4 appears in result (235 in FIG. 7).
Fixed-item-3(0): current encoding point is now at 236 in FIG. 7.
(End fixed-length item sub-process, return via arrow 75 to box 74).
(Recursive) List-6: length of list (8 bytes) recorded in at lengthLocation (box 233).
(End List sub-process recursive invocation, return via arrow 79 to box 80 in FIG. 5).
List-val-item-3(1): record offset in slot at nextOffset, which is box 232. The value is current encoding point minus firstOffset which is 20 bytes. NextOffset is now at the start of box 233.
List-val-item-4(1): Recursively invoke the list sub-process (arrow 79 to box 74 in FIG. 7).
(Recursive) List-1: reserve bytes in box 236 of FIG. 7 and set lengthLocation to the start of those bytes, current encoding point and sizeLocation to the start of box 237.
(Recursive) List-2: starting node is node 84 in FIG. 6.
(Recursive) List-3: first homogeneous collection in the residual path [CDE] (see node 28 in FIG. 2) corresponds to node 86 in FIG. 6.
(Recursive) List-4: record size of collection (3) in box 237, FIG. 7. Current encoding point is now start of 238, FIG. 7.
(Recursive) List-5: Fixed-length item sub-process chosen (arrow 75 to box 76 in FIG. 5).
Fixed-item-1(0): Residual path is [E] (see node 28 in FIG. 2), so navigate from node 88 to node 101 in FIG. 6. The value is −1.
Fixed-item-2(0): −1 appears in result (238 in FIG. 7).
Fixed-item-3(0): current encoding point is now at 239 in FIG. 7.
Fixed-item-1(1): Residual path is [E] (see node 28 in FIG. 2, so navigate from node 89 to node 102 in FIG. 6. The value is 5.
Fixed-item-2(1): 5 appears in result (239 in FIG. 7).
Fixed-item-3(1): current encoding point is now at 240 in FIG. 7.
Fixed-item-1(2): Residual path is [E] (see node 28 in FIG. 2), so navigate from node 90 to node 103 in FIG. 6. The value is 613.
Fixed-item-2(2): 613 appears in result (240 in FIG. 7).
Fixed-item-3(2): current encoding point is now at 241 in FIG. 7.
(End fixed-length item sub-process, return via arrow 75 to box 74).
(Recursive) List-6: length of list (16 bytes) recorded in at lengthLocation (box 236).

(End List sub-process recursive invocation, return via arrow 79 to box 80 in FIG. 5).
(End List-valued-item sub-process, return via arrow 79 to box 74 in FIG. 5).
List-6: length of list (44 bytes) recorded in at lengthLocation (box 229).
(End List sub-process, return via arrow 73 to box 70 in FIG. 5).
Master-4(5): field 5 is in variable length portion (box 62 in FIG. 4) so serialization is at current encoding point. Offset of box 62 is in box 55 in FIG. 4 as shown by arrow 68, so the offset of the current encoding point from the start of the variable length portion (172 bytes) is recorded in box 203 in FIG. 7.
Master-5(5): list sub-process chosen (arrow 73 to box 74 in FIG. 5).
List-1: reserve bytes in box 241 of FIG. 7 and set lengthLocation to the start of those bytes, current encoding point and sizeLocation to the start of box 242.
List-2: starting node is node 81 in FIG. 6.
List-3: first homogeneous collection in path (see node 29 in FIG. 2) corresponds to node 82 in FIG. 6.
List-4: record size of collection (2) in box 242, FIG. 7. Current encoding point is now start of 243, FIG. 7.
List-5: List-valued item sub-process chosen (arrow 79 to box 80 in FIG. 5).
List-val-item-1: two-slot offset table reserved (boxes 243 and 244 in FIG. 7). Both firstOffset and nextOffset point to start of 243. Current encoding point is now at start of box 245.
List-val-item-2: iterate remaining steps for the members of the array node 82; these are nodes 83 and 84.
List-val-item-3(0): record offset in slot at nextOffset, which is box 243. The value is current encoding point minus firstOffset which is 8 bytes. NextOffset is now at the start of box 244.
List-val-item-4(0): Recursively invoke the list sub-process (arrow 79 to box 74 in FIG. 7).
(Recursive) List-1: reserve bytes in box 245 of FIG. 7 and set lengthLocation to the start of those bytes, current encoding point and sizeLocation to the start of box 246.
(Recursive) List-2: starting node is node 83 in FIG. 6.
(Recursive) List-3: first homogeneous collection in the residual path [CDE] (see node 29 in FIG. 2) corresponds to node 85 in FIG. 6.
(Recursive) List-4: record size of collection (1) in box 246, FIG. 7. Current encoding point is now start of 247, FIG. 7.
(Recursive) List-5: Fixed-length item sub-process chosen (arrow 75 to box 76 in FIG. 5) Steps will be iterated for nodes 88, 89, and 90, the three children of node 85.
Fixed-item-1(0): Residual path is [E] (see node 29 in FIG. 2), so navigate from node 87 to node 104 in FIG. 6. The value is true.
Fixed-item-2(0): true appears in result (247 in FIG. 7).
Fixed-item-3(0): current encoding point is now at 248 in FIG. 7.
(End fixed-length item subprocess, return via arrow 75 to box 74).
Recursive) List-6: length of list (5 bytes) recorded in at lengthLocation (box 245).
(End List sub-process recursive invocation, return via arrow 79 to box 80 in FIG. 5).
List-val-item-3(1): record offset in slot at nextOffset, which is box 244. The value is current encoding point minus firstOffset which is 17 bytes. NextOffset is now at the start of box 245.

List-val-item-4(1): Recursively invoke the list sub-process (arrow 79 to box 74 in FIG. 7).
(Recursive) List-1: reserve bytes in box 248 of FIG. 7 and set lengthLocation to the start of those bytes, current encoding point and sizeLocation to the start of box 249.
(Recursive) List-2: starting node is node 84 in FIG. 6.
(Recursive) List-3: first homogeneous collection in the residual path [CDE] (see node 29 in FIG. 2) corresponds to node 86 in FIG. 6.
(Recursive) List-4: record size of collection (3) in box 249, FIG. 7. Current encoding point is now start of 250, FIG. 7.
(Recursive) List-5: Fixed-length item sub-process chosen (arrow 75 to box 76 in FIG. 5).
Fixed-item-1(0): Residual path is [E] (see node 29 in FIG. 2), so navigate from node 88 to node 105 in FIG. 6. The value is false.
Fixed-item-2(0): false appears in result (250 in FIG. 7).
Fixed-item-3(0): current encoding point is now at 251 in FIG. 7.
Fixed-item-1(1): Residual path is [E] (see node 29 in FIG. 2, so navigate from node 89 to node 106 in FIG. 6. The value is false.
Fixed-item-2(1): false appears in result (251 in FIG. 7).
Fixed-item-3(1): current encoding point is now at 252 in FIG. 7.
Fixed-item-1(2): Residual path is [E] (see node 29 in FIG. 2), so navigate from node 90 to node 107 in FIG. 6. The value is true.
Fixed-item-2(2): true appears in result (252 in FIG. 7).
Fixed-item-3(2): current encoding point is now at 253 in FIG. 7.
(End fixed-length item sub-process, return via arrow 75 to box 74).
(Recursive) List-6: length of list (7 bytes) recorded in at lengthLocation (box 248).
(End List sub-process recursive invocation, return via arrow 79 to box 80 in FIG. 5).
(End List-valued-item sub-process, return via arrow 79 to box 74 in FIG. 5).
List-6: length of list (32 bytes) recorded in at lengthLocation (box 241).
(End List sub-process, return via arrow 73 to box 70 in FIG. 5).
Master-4(6): field 6 is in variable length portion (box 63 in FIG. 4) so serialization is at current encoding point. Offset of box 63 is in box 56 in FIG. 4 as shown by arrow 69, so the offset of the current encoding point from the start of the variable length portion (208 bytes) is recorded in box 204 in FIG. 7.
Master-5(6): Non-list sub-process chosen (arrow 71 to box 74 in FIG. 5).
Non-List-1: navigate from node 81 to 108 in FIG. 6, based on the path recorded in node 30 in FIG. 2. The value is −12.
Non-List-2: −12 appears in result (253 in FIG. 7).
Non-List-3: current encoding point now at start of 254 in FIG. 7.
(End Non-list sub-process, return via arrow 71 to box 70 in FIG. 5).
Master-4(7): field 7 is in variable length portion (box 64 in FIG. 4), so serialization is at the current encoding point. No offset to record.
Master-5(7): non-list sub-process chosen (arrow 71 to box 72 in FIG. 5).

Non-List-1: navigate from node 81 to 109 in FIG. 6, based on the path recorded in node 31 in FIG. 2. The value is "pear".

Non-List-2: "pear" appears in result (254 in FIG. 7).

Non-List-3: current encoding point now at end of 254 in FIG. 7.

(End Non-list sub-process, return via arrow 71 to box 70 in FIG. 5).

Master-6: current encoding point minus start of byte stream is length of byte stream.

Master pr cess ends. Serialization process ends.

The Random Access Process

To fulfill the promise of the invention, the random access process supports two operations. Both are accomplished without deserializing the byte stream as a whole.

1. Retrieve a single scalar value from the byte stream, given only (1) the field number (from the layout) to which the value corresponds and (2) the index positions in any homogeneous collections within which the value is enclosed. This is accomplished in near-constant time.

2. Given a "table" (represented in the schema as a list of tuples and represented in the in-memory representation as a homogeneous collection of heterogeneous collections), scan a column of that table within the byte stream to determine the index matched by a particular key value. The table row is designated by (1) the field number (from the layout) to which the values making up the column correspond and (2) the index positions in any homogeneous collections within which all of the values comprising the column are enclosed. This is accomplished in time proportional to the number of rows in the table but nearly insensitive to the number of columns or other aspects of information structure complexity.

The description of the random access process is a description of how these two operations are accomplished. This is followed by an example that illustrates both operations.

At the start of either operation, the schema tree representation of a particular schema is available, along with the layout computed from that schema tree representation, and a byte stream resulting from serialization (at some earlier time) of an in-memory representation conforming to that schema tree representation. The in-memory representation itself is not available.

Retrieving Scalar Values

Available at the start of this operation are a byte stream, a layout, a schema tree representation, a field number whose value is of interest, and zero or more non-negative integer position numbers. If the field number has more than one scalar value in the byte stream, that will be because the schema leaf node to which it corresponds has list elements in its path. For each such list element, one position number corresponds and indicates a position in the homogeneous collection in the in-memory representation from which the byte stream was serialized. One way that these position numbers will have been obtained is by employing the operation of scanning table columns described below as part of this invention. The position numbers together uniquely determine a scalar value. If the number of supplied position numbers does not match the number of list elements in the path, the request does not properly designate a scalar value and the operation fails. Otherwise, the operation comprises 7 steps.

Step 1. The field number is used to consult the layout. This says whether the value is in the fixed-length or variable-length part of the byte stream and, if it is in the variable-length portion, how to compute its offset. If the value is in the fixed length portion, its offset is already known. The value is retrieved and the operation ends. Otherwise, remaining steps are executed.

Step 2. The offset of the field within the variable-length portion is determined. Details depend on the layout style.

Layout style 1. The offset of the field is read from a slot in the fixed-length portion of the byte stream that corresponds to the field number.

Layout style 2. There are two substeps.

Sub-step a. Determine the field whose field number is equal to or less than that of the field of interest and whose offset is recorded in the fixed-length byte stream portion. Read that offset. If there is no such field, use as the offset the start of the variable-length byte stream portion.

Sub-step b. If sub-step (a) provided the offset of the field, step 2 is accomplished. Otherwise, add a precomputed increment to the offset of sub-step (a) to get the offset of the field of interest. This precomputed increment will be the combined lengths of fixed-length fields preceding the field in the byte stream starting with the one whose offset is recorded.

While processing for layout style 2 sounds more complex, only one offset is read from the byte stream and all other information necessary to accomplish the action efficiently is precomputed and part of the layout. So, this, too, is a constant-time operation.

Step 3. If there are no position numbers, the value is read from the byte stream at the offset computed in step 2 and the operation completes. Otherwise, remaining steps are executed.

Step 4. Iterate through the supplied position numbers, performing steps 5 and 6 on each position number.

Step 5 (repeated by step 4). This step adds 8 to the "previous offset" which is either the offset computed by step 2 or the offset computed by the previous iteration of step 6. Adding 8 bytes skips over the length and size fields that are present at the start of every list.

Step 6 (repeated by step 4). This step computes a new offset from the offset computed by step 5. There are two cases, determined as follows. If the iteration has reached the last position number and the field has a fixed length encoding, we perform the fixed case. Otherwise, we perform the varying case.

Fixed case. The position number is multiplied by the size in bytes of the fixed encoding for the field's data type. This result is added to the offset computed in step 5.

Varying case. The position number is multiplied by four. This result is added to the offset computed in step 5, yielding the offset of a slot in the list's offset table. An offset is read from that slot in the offset table and added to the offset computed in step 5.

Step 7. A value is read from the byte stream at the offset computed by the last iteration of step 6. That is the desired value and the operation completes.

Scanning Table Columns

Available at the start of this operation are a byte stream, a layout, a schema tree representation, a key item to be matched, a field number whose values are to be scanned for a match, and zero or more position numbers. The field number must be one that designates more than one scalar value in the byte stream because the schema leaf node to which it corresponds has list elements in its path (otherwise, the operation fails). For each list element in the field's path, except for the last, one of the supplied position numbers corresponds and indicates a position in the homogeneous collection in the in-memory representation from which the byte stream was serialized (there will be zero position numbers if the path has only one list element). If the number of supplied position numbers does not match the number of list elements in the field's path minus one, the request does not properly designate a table column with scalar values and the operation fails. Otherwise, it comprises 9 steps.

Step 1. The field number is used to consult the layout. This says how to find the field in the variable-length portion of the byte stream (it must be in that portion, since it is a list).

Step 2. The offset of the field within the variable-length portion is determined. Details depend on the layout style.

Layout style 1. The offset of the field is read from a slot in the fixed-length portion of the byte stream corresponding to the field number.

Layout style 2. There are two substeps.

Sub-step a. Determine the leaf node whose field number is equal to or less than that of the field of interest and whose offset is recorded in the fixed-length byte stream portion. Read that offset. If there is no such field, use as the offset the start of the variable-length byte stream portion.

Sub-step b. If sub-step (a) provided the offset of the field, step 2 is accomplished. Otherwise, add a precomputed increment to the offset of sub-step (a) to get the offset of the field of interest. This precomputed increment will be the combined lengths of fixed-length fields preceding the field in the byte stream.

Step 3. Iterate through the position numbers, if any, performing steps 4 and 5 on each position number. If there are no position numbers, skip steps 4 and 5.

Step 4 (repeated by step 3). This step adds 8 to the "previous offset" which is either the offset computed by step 2 or the offset computed by the previous iteration of step 5. Adding 8 bytes skips over the length and size fields that are present at the start of every list.

Step 5 (repeated by step 3). This step computes a new offset from the offset computed by step 4. The position number is multiplied by four. This result is added to the offset computed in step 4, yielding the offset of a slot in the list's offset table. An offset is read from that slot in the offset table and added to the offset computed in step 4.

Step 6. The offset now points to the list that is to be scanned. The size of the list (number of elements) is read from a point four bytes after the start of the list (skipping over the length field). That gives the number of rows in the table. The offset is incremented by 8 to skip both the length field and the size field.

Step 7. If the field has a scalar data type that has a variable length encoding, multiply the size by 4 and add this to the offset. That skips over the offset table and gives the offset of the actual data in the list. Otherwise, there is no offset table and the offset computed in step 6 is used unchanged.

Step 8. Iterate through the items of data in the list, comparing each item to the key item, and stopping on a match or after visiting the entire list as given by the size which was read in step 6. Recall that all scalar value encodings must provide a way of determining where they start and end so that such sequential scanning is possible.

Step 9. If step 8 terminated with a match, return the index position of the matched item. Otherwise, indicate a "not matched" exception.

EXAMPLE

Suppose the application, having the byte stream depicted in FIG. 7, wants to retrieve one of the boolean values of field number is 5, corresponding to the key value "dog" for field 2 (string) and the key value "joe" for field 3 (string).

The way the application designer would think of this operation is best understood with reference to FIG. 2, which shows the schema tree representation with field numbers added. The application wants to find the member of the list shown as node 19 that has "dog" as its value for node 26 (field 2), then, in that same list member, find the member of the list shown as node 21 that has "joe" as its value for node 27 (field 3), then, in that same list member, retrieve the value of node 29 (field 5).

To scan the values of field 2 for the key value "dog" the application supplies both the field number 2 and the key value "dog" as inputs to the operation of scanning table columns.

Step 1. The layout (see FIG. 4) says that field 2 is in the variable-length message portion (byte range 59), using the offset to field 1 recorded in slot 0 of the fixed portion (slot 52 and arrow 65).

Step 2. The offset in slot 0 of the fixed portion (8 bytes) is read from the byte stream (200 in FIG. 7) and the length of field 1 (4 bytes) is added to it to provide the offset to field 2. This is 12 bytes, which when added to the start of the variable length portion at 205 in FIG. 7, computes the start of byte range 207 in FIG. 7.

Step 3. As there are no position numbers, steps 4 and 5 will be skipped.

Step 4/step 5: Skipped (iterated zero times by step 3).

Step 6: Adding 4 bytes to the offset of byte range 207 yields byte range 208 and the size of the list (2) is read from there. We skip to the beginning of the offset table (box 209 in FIG. 7).

Step 7: The offset table (8 bytes as computed by this step) is skipped over and we are now pointing to the first element in the list ("charles", which is 211 in FIG. 7).

Step 8: Iterate through the two items looking for a match on "dog" which occurs at index 1 (it is matched as the second of two items in the list).

Step 9: Return index 1.

The application now knows that the nested table corresponding to key value "dog" is at position 1 in the homogeneous collection represented by node 19 in FIG. 2.

To scan the values of field number 3 for the key value "joe", the operation for scanning tables is invoked again, this time with field number 3, key item "joe", and a single position number 1 determined in the previous scanning operation.

Step 1. The layout (see FIG. 4) says that field number 3 is in the variable-length message portion (area 60), with its offset recorded in slot 1 of the fixed portion (slot labeled 53, and arrow 66).

Step 2. The offset in slot 1 of the fixed portion (46 bytes) is read (201 in FIG. 7) to give the offset to field 3 (213 in FIG. 7).

Step 3. There will be one iteration of steps 4 and 5 with the position number 1.

Step 4. The length and size fields (213 and 214) are skipped over, yielding the offset of the start of 215.

Step 5. The second offset table entry (position number 1) slot is read (27 bytes, read from box 216 in FIG. 7) and the value added to the offset of step 4, yielding the offset of the second list (221 in FIG. 7).

Step 6. The size field (3) is read (222 in FIG. 7) and it and the length field are skipped over yielding the offset of 223 in FIG. 7.

Step 7. The offset table is skipped over yielding the offset of 226 in FIG. 7.

Step 8. Iterate through the items looking for a match on "joe" which occurs at index 1.

Step 9. Index 1 is returned.

The application now knows that the desired value in field 5 is at positions 1 and 1, respectively, in the nested homogeneous collections represented by nodes 19 and 21 in FIG. 2. The scalar value random access operation is invoked with that information.

Step 1. The layout (see FIG. 4) says that field 5 is in the variable-length message portion (62 in FIG. 4) with its offset stored in the fourth slot of the fixed portion (slot 55 and arrow 68 in FIG. 4).

Step 2. The offset in the fourth slot of the fixed portion (172 bytes) is read (203 in FIG. 7) to give the offset to field 5 (241 in FIG. 7).

Step 3. As there are position numbers remaining to be processed, a value cannot be returned at this point so the operation continues.

Step 4. The position numbers 1 and 1 will each cause an iteration of steps 5 and 6.

Step 5(0). 8 is added to the offset of 241, yielding the offset of 243.

Step 6(0). The offset is adjusted by 17 bytes, read from the second offset table slot (244 in FIG. 7), yielding the offset of 248.

Step 5(1). 8 is added to the offset of 248, yielding the offset of 250.

Step 6(1). The offset is increased by the length of a boolean, times 1 and now addresses the value (false) in slot 251, which is the desired value.

Step 7. The desired value is read from the message and returned.

The Schema Reorganization Process (Optional)

When a schema contains variants, there is an alternative to truncating the schema at the variant nodes and changing the variants to dynamic type. The alternative, which is based on known results in type isomorphism, turns a single schema into several schemas, each describing one case of a top-level variant, where that variant is the result of distributing tuples over variants to the greatest extent possible.

Figure 8:
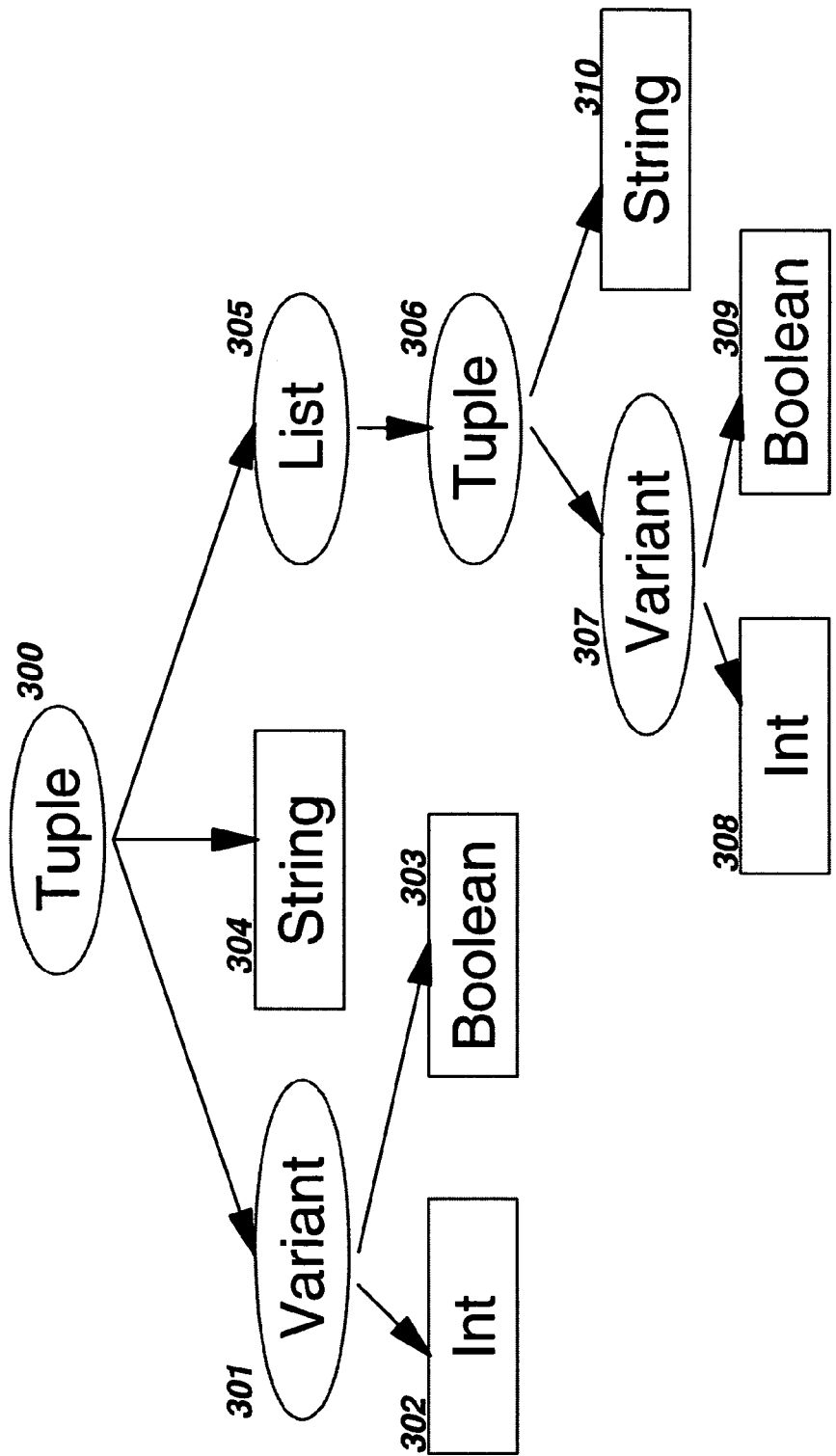
FIG. 8 shows a different example schema that benefits from reorganization in order to achieve maximum benefit from the invention.

FIG. 8 shows a schema that contains two variants (nodes 301 and 307) as well as tuples (300 and 306), a list (305) and scalar types (302 through 304, and 308 through 310). If this schema were to be truncated in the usual way, both variants would be replaced by dynamic type leaf nodes. In a schema as simple as this, such a truncation will probably not harm efficiency to a serious extent. But, each dynamic type node requires a recursive use of the invention and each recursive use of the invention adds overhead to the ultimate goal of accessing individual scalar values from the byte stream.

Figure 9:
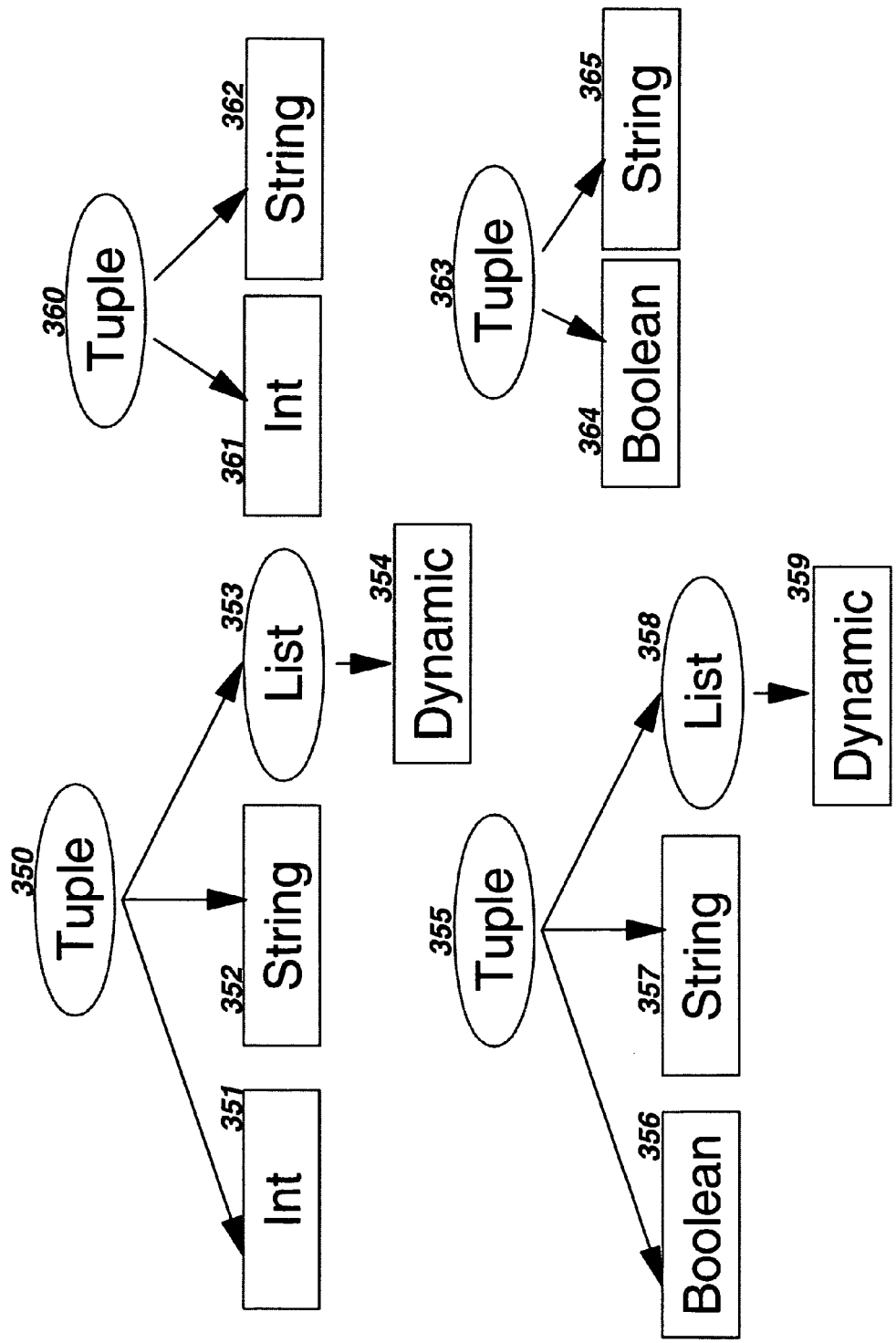
FIG. 9 shows the example schema of FIG. 8, reorganized so as to achieve maximum benefit from the invention.

As an alternative, the tuple 300 can be distributed over the variant 301 and the tuple 306 can be distributed over the variant 307, resulting in the four schemas shown in FIG. 9. The contents of FIG. 9 will be explained after describing the general algorithm.

The algorithm for distributing a tuple over a variant comprises the following nine steps.

Step 1. Find an occurrence in the schema where a tuple is a child of another tuple or a variant is a child of another variant. If any such case is found, remove the child tuple and make its children into direct children of the parent tuple or remove the child variant and make its children into direct children of the parent variant.

Step 2. Repeat step 1 until it can no longer be applied.

Step 3. Find an occurrence in the schema where a variant is a child of a tuple. If any such case is found, perform steps 4 through 6 using that variant and tuple.

Step 4. Make a new tuple is comprised of the variant's first child and all children of the tuple other than the variant.

Step 5. Repeat step 4 for all of the remaining children of the variant, resulting in as many new tuples as there were children of the variant.

Step 6. Form a new variant whose children are the new tuples created in steps 4 and 5. Replace the original tuple and all of its descendants in the schema tree with the new variant and all of its descendants.

Step 7. Repeat steps 1 through 6 until none of them are applicable.

The result of applying this algorithm to a schema tree representation whose interior nodes comprise only of tuples and variants is a schema tree representation whose sole variant (if any) is the root node (there will be no variants at all if there were none to begin with). The invention can then be applied by discarding the variant root node and treating each case of the variant as a different schema for the purpose of using the invention.

The result of applying this algorithm to a schema tree representation with list nodes as well as tuples and variants may retain variants in the result that are not at the root. These will always be the direct children of lists, and they arise because the algorithm's steps will never bring a variant and tuple into direct parent-child relationship when a list intervenes. These variants under lists must still be-replaced by dynamic type nodes as described earlier.

FIG. 9 shows the result of applying the schema reorganization process to the example schema of FIG. 8. The schema rooted at node 350 represents the original schema when the variant 301 in FIG. 8 takes on an integer value. It is a tuple with children 351, 352, and 353, corresponding to the original nodes 302, 303, and 304 (respectively) in FIG. 8. Note that the child of the list node 353 is now a dynamic node 354, which represents a truncation because the algorithm for distributing tuple 306 over variant 307 created a new variant node at this point.

Similarly, the schema is comprised of nodes 355 through 359 represents the original schema when the variant 301 takes on a boolean value.

The schema is comprised of nodes 360 through 362 represents the fragment of the original schema whose local root is 306 when variant 307 takes on an integer value. It is used to encode each dynamic type value of nodes 354 or 359 that contains an integer. Similarly, the schema is comprised of nodes 363 through 365 represents the same fragment of the original schema whose local root is 306 when variant 307 takes on a boolean value. It is used to encode each dynamic type value of nodes 354 or 359 that contains a boolean.

Apparatus Implementation

The present invention includes an apparatus performing methods of this invention. In an example embodiment, the apparatus comprises a serializer/deseralizer for a byte stream form of an information structure, said information structure having a schema and an in-memory representation, said schema having a schema tree representation with a plurality of schema nodes, said schema nodes including at least one leaf and at least one interior node. The serializer/deserializer comprising: a processor for computing a layout from the schema tree representation by depth-first enumeration of leaf nodes of the schema; a serializer for serializing the byte stream from the in-memory representation while grouping together all scalar items from the in-memory representation corresponding to each schema node; and a selective deserializer for accessing information from the byte stream by using the layout and offset calculations.

In some embodiments of the apparatus, the processor comprises a module for establishing a fixed length portion of the byte stream, the fixed length portion having a slot for each enumerated schema leaf node; and for establishing a varying length portion of the byte stream following the fixed length portion, the varying length portion having successive areas for any information items requiring varying length encoding.

In other embodiments of the apparatus, the processor comprises a module for establishing a fixed length portion of the byte stream, the fixed length portion having a slot for each enumerated schema leaf node having a predecessor in the depth-first numbering requiring varying length encoding; and for establishing a varying length portion of the byte stream following the fixed length portion, the varying length portion having successive areas for each enumerated schema node.

In some cases, the serializer comprises: a reconciling module to determine a correspondence between the in-memory representation and the schema tree representation; an initialization module to initialize the byte stream by reserving a fixed length portion and pointing to a beginning of a variable length portion; a lookup module to retrieve a location in the byte stream for an element of the in-memory representation information corresponding to a first schema leaf node in depth first order from the layout; and a converter to convert the element to bytes in the byte stream according to a number of elements corresponding to the schema leaf node, wherein all schema leaf nodes are retrieved and converted in depth-first order.

In some embodiments the converter comprises a recorder to record a nested list of tuples in column order rather than row order, resulting in a set of nested lists, and/or the converter precedes each list of varying length items with an offset table allowing any element of said each list to be reached in constant time from a head of said each list.

In some embodiments, the selective de-serializer scans a list of key values representing a table column serialized within the byte stream to determine an index position, and uses the index position in conjunction with offset calculations and offset tables serialized at the starts of lists within the byte stream to find information in lists representing non-key table columns.

In some embodiments, the schema tree representation is derived from a schema graph representation by truncating recursive definitions and variants and replacing them with leaf nodes of dynamic type, and/or a preliminary reorganization of the schema is performed to distribute tuples over variants prior to carrying out the remaining steps.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

I claim:

1. A method comprising organizing a byte stream of an information structure, said information structure having a schema and an in-memory representation, said schema having a schema tree representation with a plurality of schema nodes, said schema nodes including at least one leaf and at least one interior node, the step of organizing comprising the steps of:

computing a layout from the schema tree representation depth-first enumeration of leaf nodes of the schema;

serializing the byte stream from the in-memory representation while grouping together all scalar items from the in-memory representation corresponding to each schema node, wherein the step of serializing the byte stream further comprises the steps of:

retrieving a location in the byte stream for an element of the in-memory representation corresponding to a first schema leaf node in depth first order from the layout;
converting the element to bytes in the byte stream according to a number of elements corresponding to the schema leaf node, storing a result during said converting the element; and
accessing information from the byte stream by using the layout and offset calculations, wherein the step of accessing information further comprises the steps of:
scanning a list of key values representing a table column serialized within the byte stream to determine an index position; and
using the index position in conjunction with offset calculations and offset tables serialized at the start of lists within the byte stream to find information in lists representing non-key table columns.

2. The method as recited in claim 1, wherein information structure is a message.

3. The method as recited in claim 1, wherein the step of computing a layout comprises:
establishing a fixed length portion of the byte stream, the fixed length portion having a slot for each enumerated schema leaf node; and
establishing a varying length portion of the byte stream following the fixed length portion, the varying length portion having successive areas for any information items requiring varying length encoding.

4. The method as recited in claim 1, wherein the step of computing the layout comprises:
establishing a fixed length portion of the byte stream, the fixed length portion having a slot for each enumerated schema leaf node having a predecessor in depth-first numbering requiring varying length encoding; and
establishing a varying length portion of the byte stream following the fixed length portion, the varying length portion having successive areas for said each enumerated schema leaf node.

5. The method as recited in claim 1 wherein the interior nodes of said schema tree representation are restricted to list and tuple nodes, and the leaf nodes comprise scalar types and dynamic types.

6. The method as recited in claim 1, wherein the step of serializing the byte stream comprises:
determining a correspondence between the in-memory representation and the schema tree representation;
initializing the byte stream by reserving a fixed length portion and pointing to a beginning of a variable length portion; and
repeating the steps of retrieving and converting for all schema leaf nodes in depth-first order.

7. The method as recited in claim 1, wherein the step of converting elements to bytes comprises recording a nested list of tuples in column order rather than row order, resulting in a set of nested lists.

8. The method as recited in claim 1, wherein the step of converting elements to bytes comprises preceding each list of varying length items with an offset table allowing any element of said each list to be reached in constant time from a head of said each list.

9. The method as recited in claim 1, wherein the schema tree representation is derived from a schema graph representation by truncating recursive definitions and variants and replacing truncated sub-trees with leaf nodes of a dynamic type.

10. The method as recited in claim 1, further comprising performing a preliminary reorganization of the schema to distribute tuples over variants prior to carrying out the steps of computing, serializing and accessing.

11. A computer program product stored in a computer readable storage medium having stored thereon a sequence of instructions which, when executed by a processor, causes the processor to organize a byte stream of an information structure, wherein the computer program product executes the steps of:
computing a layout from a schema tree representation by depth-first enumeration of leaf nodes of the schema
serializing the byte stream from a in-memory representation while grouping togther all scalar items froms the in-memory representation corresponding to each schema node, wherein the step of serializing the byte stream further comprises the steps of:
retrieving a location in the byte stream for an element of the in-memory represention corresponding to a first schema leaf node in depth first order from the layout;
comverting the element to bytes in the byte stream according to a number of elements corresponding to the schema leaf node, storing a result during said converting the element; and
accessing information from the byte stream by using thelayout and offset calculations, wherein the step of accessing information further comprises the steps of:
scanning a list of key values representing a table column serialized within the byte stream to determine an index position; and
using the index position in conjunction with offset calculation and offset tables serialized at the start of lists within the byte stream to find information in lists representing non-key table columns.

12. An apparatus comprising a serializer/deseralizer for a byte stream form of an information structure, said information structure having a schema and an in-memory representation, said schema having a schema tree representation with a plurality of schema nodes, said schema nodes including at least one leaf and at least one interior node, the serializer/deserializer comprising:
a processor for computing a layout from the schema tree representation by depth-first enumeration of leaf nodes of the schema;
a serializer for serializing the byte stream from the in-memory representation while grouping together all scalar items from the in-memory representation corresponding to each schema node, wherein the serializer further comprises a lookup module to retrieve a location in the byte stream for an element of the in-memory representation corresponding to a first schema leaf node in depth first order from the layout;
a converter to convert the element to bytes in the byte stream according to a number of elements corresponding to the schema leaf node, wherein all schema leaf nodes are retrieved and converted in depth-first order, storing a result during said converting the element; and
a selective de-serializer for accessing information from the byte stream by using the layout and offset calculations, wherein the selective de-serializer scans a list of key values representing a table column serialized within the byte stream to determine an index position, and uses the index position in conjunction with offset calculations and offset tables serialized at the start of lists within the byte stream to find information in lists representing non-key table columns.

13. The apparatus as recited in claim 12, wherein the processor comprises:
   a module for establiabing a fixed length portion of the byte stream, the fixed length portion having a slot for each enumerated schema leaf node; and
   for establishing a varying length portion of the byte stream following the fixed length portion, the varying length portion having successive areas for any information items requiring varying length encoding.

14. The apparatus as recited in claim 12, wherein the processor comprises:
   a module for establishing a fixed length portion of the byte stream, the fixed length portion having a slot for each enumerated schema leaf node having a predecessor in depth-first numbering requiring varying length encoding; and
   for establishing a varying length portion of the byte stream following the fixed length portion, the varying length portion having successive areas for said each enumerated schema leaf node.

15. The apparatus as recited in claim 12, wherein the serializer comprises:
   a reconciling module to determine a correspondence between the in-memory representation and the schema tree representation;
   an initialization module to initialize the byte stream by reserving a fixed length portion and pointing to a beginning of a variable length portion.

16. The apparatus as recited in claim 12, wherein the converter comprises a recorder to record a nested list of tuples in column order rather than row order, resulting in a set of nested lists.

17. The apparatus as recited in claim 12, wherein the converter precedes each list of varying length items with an offset table allowing any element of said each list to be reached in constant time from a head of said each list.

18. apparatus as recited in claim 12, wherein the schema tree representation is derived from a schema graph representation by truncating recursive definitions and variants and replacing them with leaf nodes of dynamic type.

19. The apparatus as recited in claim 12, wherein a preliminary reorganization of the schema is performed to distribute tuples over variants prior to carrying out the remaining steps.

20. A computer program product stored in a computer readable storage medium having stored thereon a sequence of instructions which, when executed by a processor, causes the processor to organize a byte stream form of an information structure, wherein the computer program product executes the steps of:
   computing a layout from a schema tree representation by depth-first enumeration of leaf nodes of the schema;
   serializing the byte stream from a in-memory representation while grouping together all scalar items from the in-memory representation corresponding to each schema node, wherein the step of serializing the byte stream further comprises the steps of:
      retrieving a location in the byte stream for an element of the in-memory representation corresponding to a first schema leaf node in depth first order from the layout;
      converting the element to bytes in the byte stream according to a number of elements corresponding to the schema leaf node, storing a result during said converting the element; and
   accessing information from the byte stream by using the layout and offset calculations,
      wherein a selective de-serializer scans a list of key values representing a table column serialized within the byte stream to determine an index position, and
      using the index position in conjunction with offset calculations and offset tables serialized at the start of lists within the byte stream to find information in lists representing non-key table columns.

* * * * *